(12) United States Patent
Hahn et al.

(10) Patent No.: US 8,244,573 B2
(45) Date of Patent: Aug. 14, 2012

(54) DYNAMIC MARKETING SYSTEM AND METHOD

(75) Inventors: Christopher Hahn, Bellevue, WA (US); Kabir Shahani, Seattle, WA (US); Derek Slager, Issaquah, WA (US)

(73) Assignee: Appature Inc., Seattle, WA (US)

( * ) Notice: Subject to any disclaimer, the term of this patent is extended or adjusted under 35 U.S.C. 154(b) by 390 days.

(21) Appl. No.: 12/689,988

(22) Filed: Jan. 19, 2010

(65) Prior Publication Data
US 2010/0185496 A1 Jul. 22, 2010

Related U.S. Application Data

(60) Provisional application No. 61/145,647, filed on Jan. 19, 2009.

(51) Int. Cl.
*G06Q 30/00* (2012.01)
(52) U.S. Cl. ............ 705/7.33; 705/7.29; 705/7.31
(58) Field of Classification Search .......... 705/7.29, 705/7.31, 7.33
See application file for complete search history.

(56) References Cited

U.S. PATENT DOCUMENTS

| | | | | |
|---|---|---|---|---|
| 5,721,831 A * | 2/1998 | Waits et al. | ............ | 705/36 R |
| 6,073,112 A * | 6/2000 | Geerlings | ............ | 705/14.53 |
| 6,904,409 B1 * | 6/2005 | Lambert et al. | ............ | 705/7.33 |
| 2004/0103017 A1 * | 5/2004 | Reed et al. | ............ | 705/10 |
| 2004/0138958 A1 * | 7/2004 | Watarai et al. | ............ | 705/26 |
| 2005/0010477 A1 * | 1/2005 | Sullivan et al. | ............ | 705/14 |
| 2005/0159996 A1 * | 7/2005 | Lazarus et al. | ............ | 705/10 |
| 2005/0261951 A1 * | 11/2005 | Tighe | ............ | 705/10 |
| 2007/0043761 A1 * | 2/2007 | Chim et al. | ............ | 707/102 |
| 2009/0150213 A1 * | 6/2009 | Cyr et al. | ............ | 705/10 |
| 2009/0187461 A1 * | 7/2009 | Brignull et al. | ............ | 705/10 |
| 2010/0094758 A1 * | 4/2010 | Chamberlain et al. | ............ | 705/50 |
| 2011/0231227 A1 * | 9/2011 | Temares et al. | ............ | 705/7.33 |

OTHER PUBLICATIONS

Oracle Marketing Segmentation Guide, Version 10.1.3, Jan. 2008, p. 1-120.*
Siebel Marketing Guide, Version 7.5.3, Jun. 2003, p. 1-590.*

* cited by examiner

*Primary Examiner* — Justin M Pats
(74) *Attorney, Agent, or Firm* — ÆON Law; Adam L. K. Philipp

(57) ABSTRACT

Provided herein are systems and methods for providing access to marketing data via a reduced-complexity marketer GUI for dynamically defining market segments for use in marketing campaigns. The systems and methods provide a searchable list of person-related and entity-related pluralities of market segmentation criteria, obtain a market segmentation definition comprising a search key corresponding to selected market segmentation criteria, and perform a series of steps to obtain a first market-segment snapshot.

32 Claims, 17 Drawing Sheets

DYNAMIC MARKETING SYSTEM AND METHOD

CROSS REFERENCE TO RELATED APPLICATIONS

This application claims the benefit of priority to U.S. Provisional Application No. 61/145,647, filed Jan. 19, 2009, titled "DATABASE MARKETING SYSTEM AND METHOD," having, and naming the following inventors: Christopher Hahn, Kabir Shahani, and Derek Slager. The above-cited application is incorporated herein by reference in its entirety, for all purposes.

FIELD

The present disclosure relates to marketing, and more particularly to computer-managed enterprise marketing.

BACKGROUND

Marketers commonly use databases of customers or potential customers (also referred to as "leads") to generate personalized communications to promote a product or service. The method of communication can be any addressable medium, e.g., direct mail, e-mail, telemarketing, and the like.

A marketing database may combine of disparate sources of customer, lead, and/or prospect information so that marketing professionals may act on that information. However, it can be difficult to provide access to a rich set of data in a way that makes sense to the end user of the data (e.g., marketers), as opposed to a database administrator.

Indeed, despite the existence of current enterprise marketing management suites that purport to integrate marketing databases with campaign management and other marketing tools, it is still common for marketers to hire database consultants to perform common tasks such as defining a market segment and identifying records belonging to the defined market segment. Thus, with existing tools, defining a marketing segment and obtaining a snapshot of its members may be a difficult, expensive, and/or time-consuming process. Moreover, it may be similarly difficult, expensive, and/or time-consuming to update a snapshot of a previously-defined market segment as new records are obtained and/or existing records are modified.

DESCRIPTION

Figure 1:
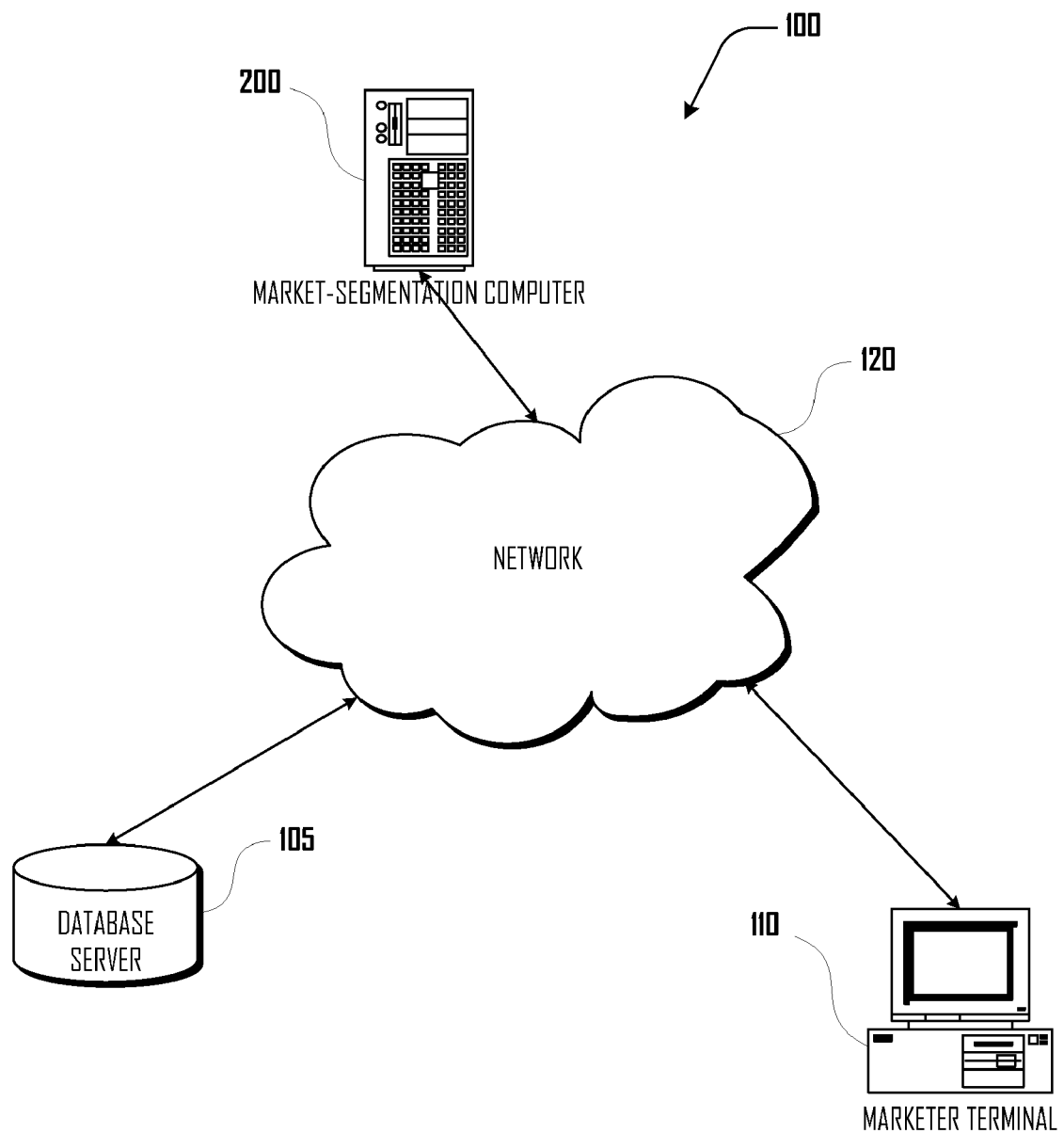
FIG. 1 is a network diagram in accordance with one embodiment.

The detailed description that follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 illustrates a number of interconnected devices in accordance with one embodiment. Database server 105, marketer terminal 110, and market-segmentation computer 200 are connected to network 120. In various embodiments, network 120 comprises communication switching, routing, and/or data storage capabilities. In various embodiments, network 120 may comprise some or all of the Internet, one or more intranets, and wired and/or wireless network portions. In various embodiments, there may be more than one database server 105, and/or marketer terminal. Moreover, while FIG. 1 shows a single market-segmentation computer 200, in alternative embodiments, the functions, processes, and routines performed by market-segmentation computer 200 could be hosted or distributed among two or more different devices. Many embodiments may use multiple devices to comprise one logical device—for example, when market-segmentation computer 200 and/or database server 105 are executed or hosted in a "cloud computing" environment.

Alternatively, in some embodiments, two or more of market-segmentation computer 200, marketer terminal 110, and/or database server 105 may be hosted on a single physical computing device. For example, in some embodiments, database server 105 may be a process executing on market-segmentation computer 200.

Marketer terminal 110 may be any device that is capable of communicating with market-segmentation computer 200, including desktop computers, laptop computers, mobile phones and other mobile devices, PDAs, set-top boxes, and the like.

Figure 2:
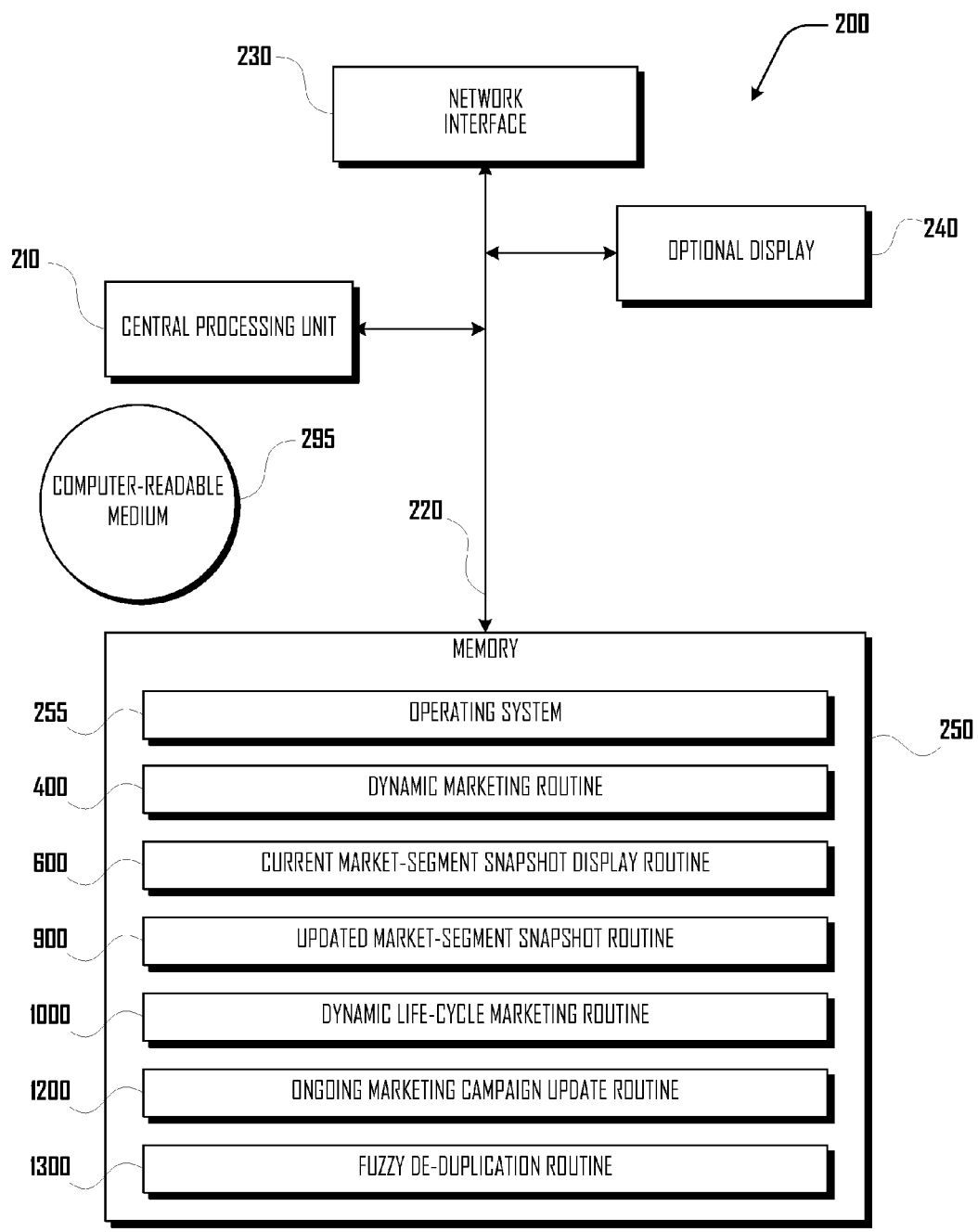
FIG. 2 illustrates one embodiment of a market-segmentation computer.

FIG. 2 illustrates an exemplary market-segmentation computer 200. The example system of FIG. 2 depicts a number of subsystems, modules, routines, and engines, some or all of which may by employed in a particular embodiment; the systems, modules, routines, and engines are not, however, limited to those illustrated. Other embodiments could be practiced in any number of logical software and physical hardware components and modules. The modules and components are listed herein merely for example.

Market-segmentation computer 200 also includes a processing unit 210, a memory 225, and an optional display 240, all interconnected, along with network interface 230, via bus 220. Memory 250 generally comprises a random access memory ("RAM"), a read only memory ("ROM"), and/or a permanent mass storage device, such as a disk drive. In some embodiments, memory 250 may also comprise a local and/or remote database, database server, and/or database service. Memory 250 stores program code for some or all of a dynamic marketing routine 400, a current market-segment snapshot display routine 600, an updated market-segment snapshot routine 900, a dynamic life-cycle marketing routine 1000, an ongoing marketing campaign update routine 1200, and a fuzzy de-duplication routine 1300. In addition, memory 250 also stores an operating system 255.

These and other software components may be loaded from a computer readable storage medium 295 into memory 250 of market-segmentation computer 200 using a drive mechanism (not shown) associated with a computer readable storage medium 295, such as a floppy disc, tape, DVD/CD-ROM drive, memory card. In some embodiments, software components may also be loaded via the network interface 230 or other non-storage media.

Figure 3:
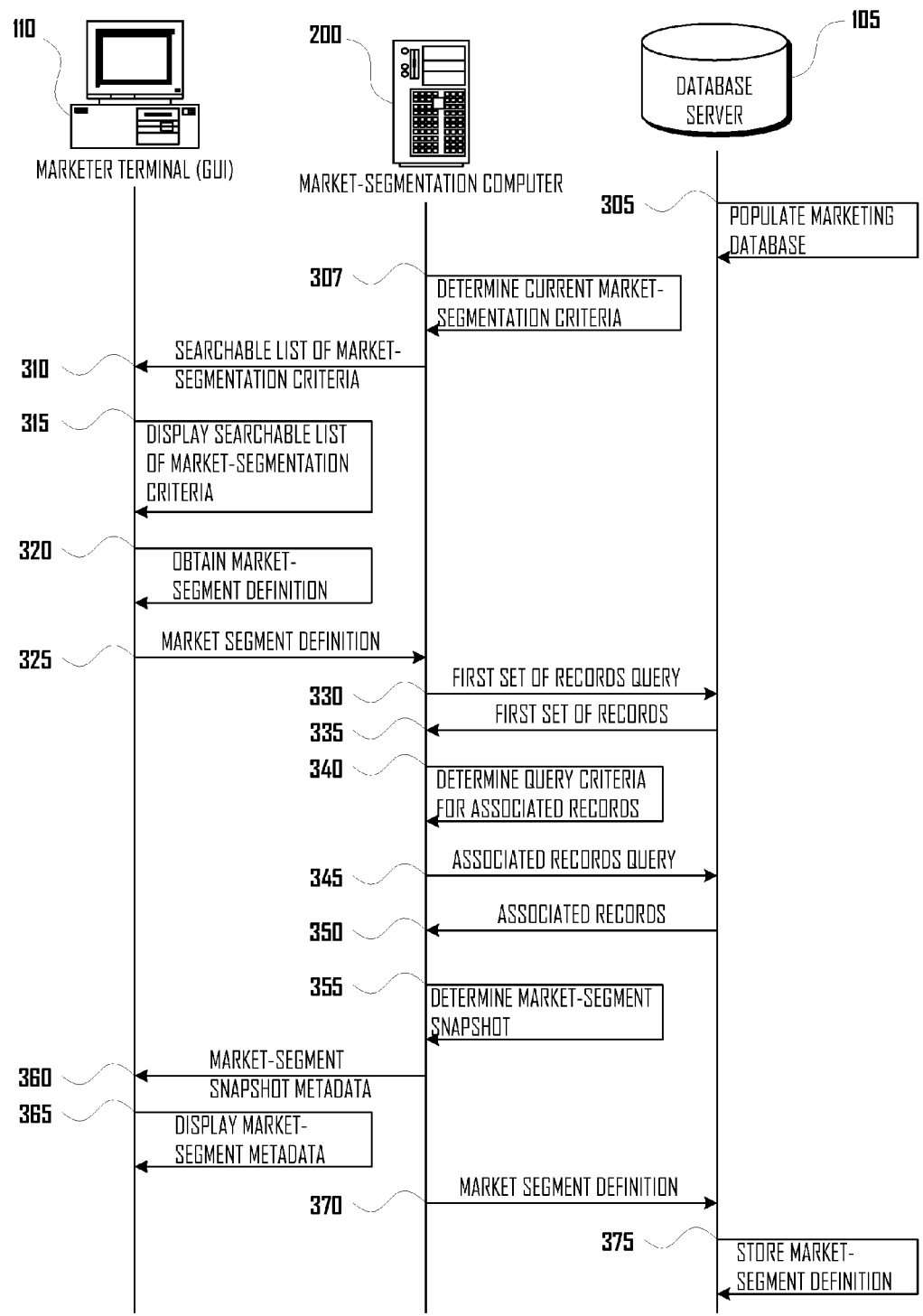
FIG. 3 is a data flow diagram illustrating a dynamic market-segmentation process in accordance with one embodiment.

FIG. 3 illustrates a high-level data flow overview of a dynamic marketing routine according to one embodiment. Initially, database server 105 populates 305 a marketing database 1500 (See FIG. 15, discussed below) with a set of records representing, e.g., current customers, prospective leads, contacts, accounts, facilities, and the like. Some such types of records (e.g., leads, contacts) may typically represent individual persons. Other such types (e.g. accounts, facilities) may typically represent entities such as associations, hospitals and other health-care facilities, organizations, businesses, and the like. Some record types (e.g., customers) may typically represent both individual persons and entities. In many cases, records from differing record types may be associated with one another in various ways. For example, an entity-type record (e.g., a facility-type record representing "City Hospital" or an association-type record representing the American Medical Association) may be at least implicitly associated with numerous contact- and/or lead-type records (e.g., records representing doctors, administrators, and other employees of City Hospital or doctors and other members of the American Medical Association).

Data to populate marketing database 1500 may come from various sources, including mailing lists, product registrations, public databases, membership lists, trade shows, and the like. In many embodiments, marketing database 1500 may be updated on an ongoing and/or periodic basis.

Once at least an initial population of records has been entered into marketing database 1500, market-segmentation computer 200 determines 307 a current set of market-segmentation criteria. As used herein, the term "market-segmentation criteria" refers to attributes of various record types from marketing database 1500 that may be used to identify commonalities among groups of people, organizations, facilities, and the like. For example, a "state of residence" attribute of customer-type records could be used to identify a market-segment including customers who reside in, e.g., the state of Washington. Any attribute stored in association with a particular record type may be considered a market-segmentation criterion. In many embodiments, record-types in marketing database 1500 may evolve over time, with new attributes being added and possibly old attributes being removed. Hence, in many embodiments, market-segmentation computer 200 may not be able to rely on a previously-determined list of market-segmentation criteria, but may need to determine a current set of market-segmentation criteria periodically or on an as-needed basis.

Market-segmentation computer 200 sends 310 a searchable list of the current market-segmentation criteria to marketer terminal 110 for display 315 in a marketer graphical user interface ("GUI") displayed thereon. Via the marketer GUI, marketer terminal 110 obtains 320 a market-segment definition from a user of marketer terminal 110. For example, in one embodiment, a user may search for and select one or more of the current market-segmentation criteria using the marketer GUI.

Marketer terminal 110 sends 325 the market segment definition to market-segmentation computer 200, which queries 330 for a first set of matching records to be returned 335 from database server 105. For example, for an appropriate market segment definition (e.g., 'state' criterion is equal to 'Washington' and 'bedcount' criterion is greater than 50), the first set of matching records may represent a partial snapshot of a market segment including facilities in Washington with over 50 beds.

Market-segmentation computer 200 also automatically determines 340 additional query criteria to match a second set of records that are associated with members of the first set of records. (See FIG. 8, discussed below.) Market-segmentation computer 200 queries 345 for a second set of matching records to be returned 350 from database server 105. For example, using the exemplary market segment definition discussed above, in one embodiment, the additional query criteria might match records associated with doctors and/or administrators at some or all of the matching facilities.

Market-segmentation computer 200 uses the first and second sets of records to determine 355 a market-segment snapshot, and market-segmentation computer 200 sends 360 metadata associated with the market-segment snapshot to marketer terminal 110 for display 365 in a marketer GUI 1600. For example, the metadata may include a count of the facility-type records in the snapshot and a count of the doctor- and/or administrator-type records in the snapshot. This metadata may be useful to a marketer using the marketer GUI 1600 to help him or her determine whether the defined market-segment has potential value.

Market-segmentation computer 200 sends 370 the market segment definition (as opposed to records included in the current snapshot) to database server 105 to be stored 375 for potential re-use.

Figure 4:
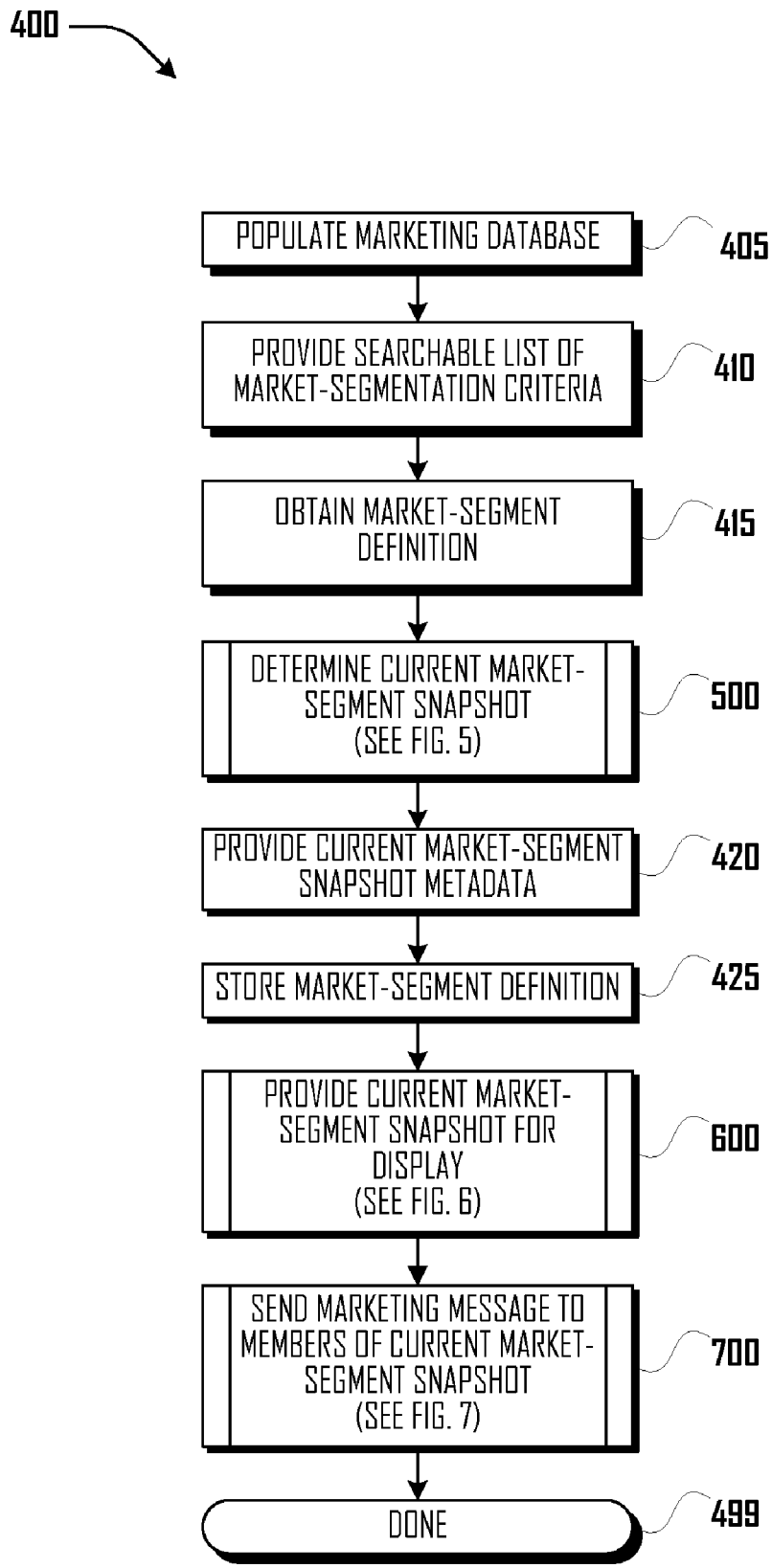
FIG. 4 is a flow diagram illustrating a dynamic marketing routine in accordance with one embodiment.

FIG. 4 illustrates a dynamic marketing routine 400 in accordance with one embodiment. In block 405, routine 400 populates a marketing database with a set of records representing, e.g., current customers, prospective leads, contacts, accounts, facilities, and the like (see discussion of database population in relation to item 305 of FIG. 3). In block 410, routine 400 provides for display in a marketer GUI a searchable list of market-segmentation criteria associated with record types in the database population. In block 415, routine 400 obtains a market-segment definition created by a user utilizing the searchable list of market-segmentation criteria. In alternate embodiments, a previously-stored market-segment definition may be obtained from, e.g., database server 105. In block 500, routine 400 performs sub-routine 500 (see FIG. 5, discussed below) to determine a current market segment snapshot. In block 420, routine 400 provides metadata 1620 associated with the current market-segmentation criteria (e.g., counts of various record types represented in the current snapshot) for display in the marketer GUI 1600.

In block 425, routine 400 stores the market-segment definition (e.g., at database server 105) for potential re-use. In some embodiments, routine 400 does not store the snapshot (i.e., the list of the current members) of the defined market-segment. Rather, in such embodiments, when the defined market-segment is used in future, current members will be dynamically determined according to the stored market-segment definition.

In block 600 (see FIG. 6, discussed below), routine 400 provides the current market-segment snapshot for display in the marketer GUI 1600. In block 700 (see FIG. 7, discussed below), routine 400 causes a marketing message to be sent to members of the current market-segment snapshot. Routine 400 ends in block 499.

Figure 5:
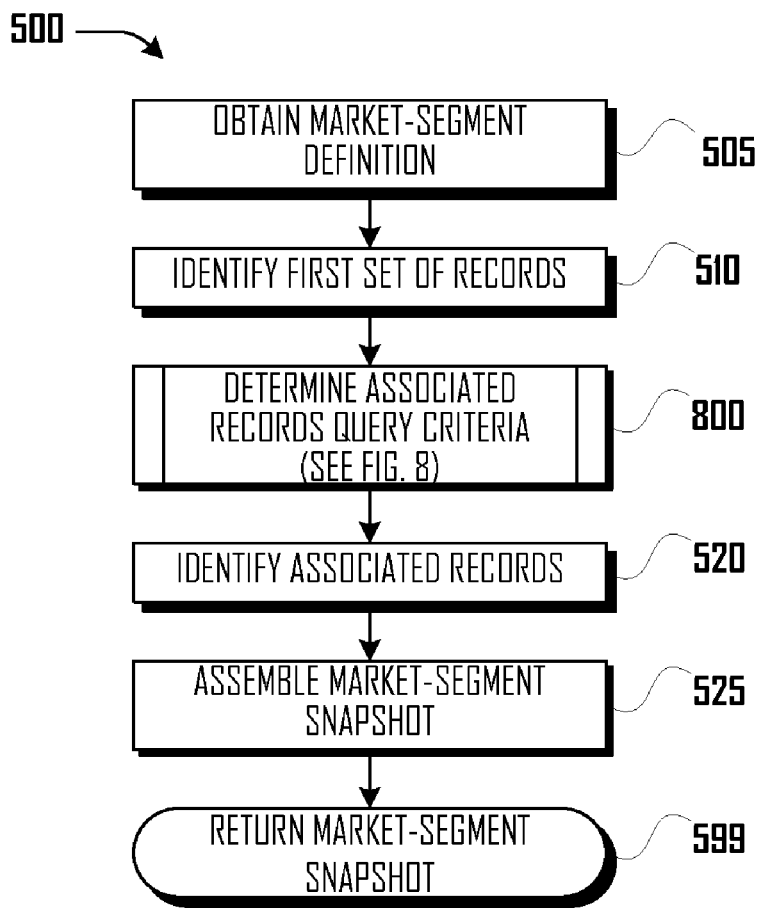
FIG. 5 is a flow diagram illustrating a dynamic market-segment snapshot subroutine in accordance with one embodiment.

FIG. 5 illustrates a dynamic market-segment snapshot subroutine 500 in accordance with one embodiment. In block 505, routine 500 obtains a market-segment definition. In some embodiments, the market-segment definition may be obtained from a marketer GUI 1600, in which a user has selected one or more criteria to define the market-segment. In other embodiments, a previously stored market-segment definition may be obtained (e.g., from database server 105).

In block 510, subroutine 500 identifies a first set of records according to the market-segment definition. In one embodiment, subroutine 500 queries database server 105 to obtain the first set of matching records. For example, for a market-segment definition including a facility 'state' criterion equal to 'Washington' and a facility 'bedcount' criterion greater than '50,' the first set of matching records may represent a partial snapshot of a market segment including facilities in Washington with over 50 beds.

In block 800 (see FIG. 8, discussed below), routine 500 determines query criteria to identify a second set of records that are associated with the first set of records. In block 520, subroutine 500 identifies the second set of records according to the determined query criteria. In one embodiment, subroutine 500 queries database server 105 to obtain the second set of matching records. For example, in one embodiment, the additional query criteria might match records associated with doctors and/or administrators at some or all of the identified facilities in Washington with over 50 beds.

In block 525, subroutine 500 assembles a current market-segment snapshot using the first and second sets of records. In block 599, subroutine 500 ends, providing the assembled current market-segment snapshot to the caller.

Figure 6:
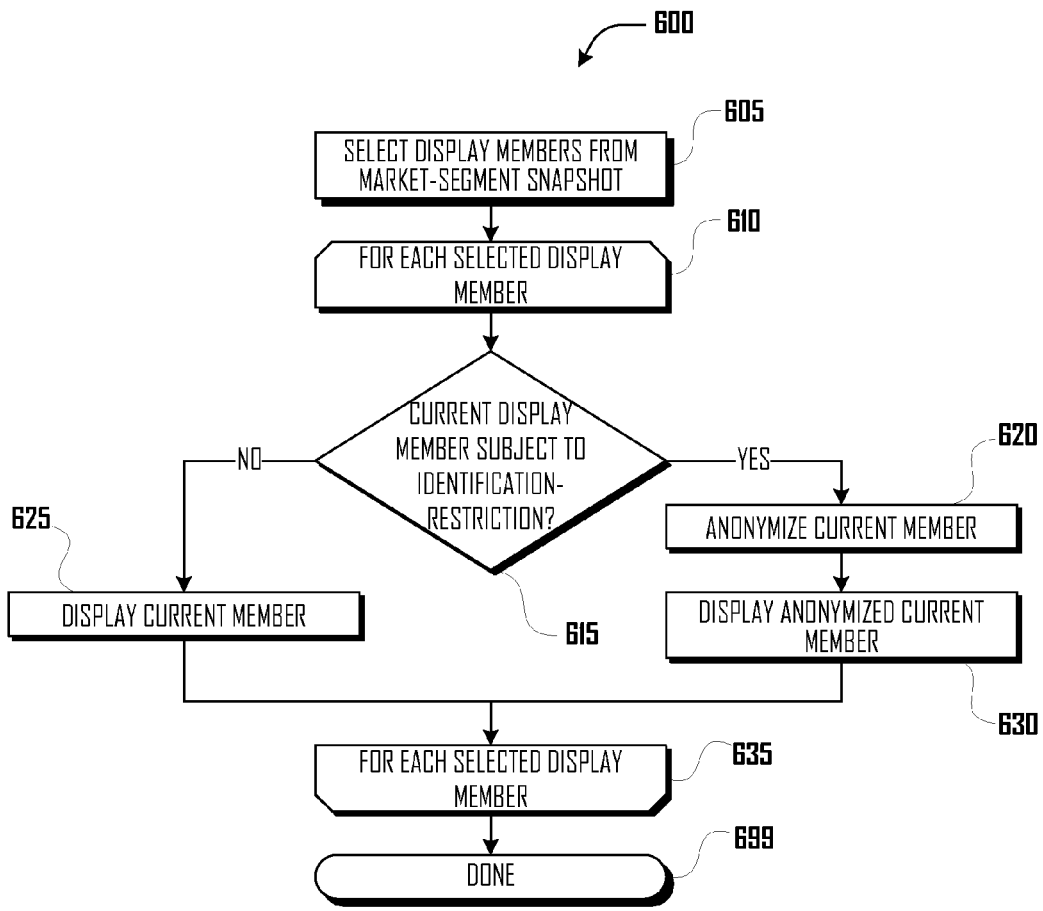
FIG. 6 is a flow diagram illustrating a current market-segment snapshot display routine in accordance with one embodiment.

FIG. 6 illustrates a current market-segment snapshot display subroutine 600 in accordance with one embodiment. In block 605, subroutine 600 selects some or all of the members of a market-segment snapshot for display. For example, in one embodiment, a large snapshot may be displayed in a series of "pages," each displaying a certain number ("X") of records. Thus, in such cases, subroutine may select the Nth set of X members for display on the current page, where "N" refers to the number of the current page. In other embodiments, all members of the snapshot may be selected for display. In still other embodiments, members may be selected according to user-provided or other criteria (e.g., all members of a certain type).

Beginning in block 610, subroutine 600 iterates over each member of the snapshot that has been selected for display. In decision block 615, subroutine 600 determines whether the current member of the snapshot is subject to an identification restriction. If subroutine 600 determines that the current member is not subject to an identification-restriction, subroutine 600 provides the member record for non-anonymous display in block 625.

If, however, subroutine 600 determines that the current member is subject to an identification-restriction, subroutine 600 anonymizes the member record in block 620 and provides the anonymized member record for display in block 630. For example, the Health Insurance Portability and Accountability Act ("HIPAA") may require that personally-identifying information be redacted when confidential medical information could otherwise be associated with an individual. Thus, if a member record of the market-segment snapshot includes data related not only to an individual's identity (e.g., name, address, and the like) but also to the individual's medical history (e.g., medical treatments that the individual may have previously received), HIPAA may prohibit disclosing personally-identifying information to a marketer. In such a case, subroutine 600 may redact or anonymize personally-identifying information before the member record is displayed to the marketer. In some embodiments, subroutine 600 may further associate an anonymous unique identifier with the member so that the marketer may send marketing messages (even personalized marketing messages) to the individual associated with the member record without the individual's identifying information being exposed to the marketer. Thus, in some embodiments, a marketer may, in compliance with HIPAA and/or other identification-restrictions, market to a market-segment without exposing to the marketer personally-identifying information about individuals in the market segment.

In block 635, subroutine 600 cycles back to block 610 to process the next selected display member. Subroutine 600 ends in block 699.

Figure 7:
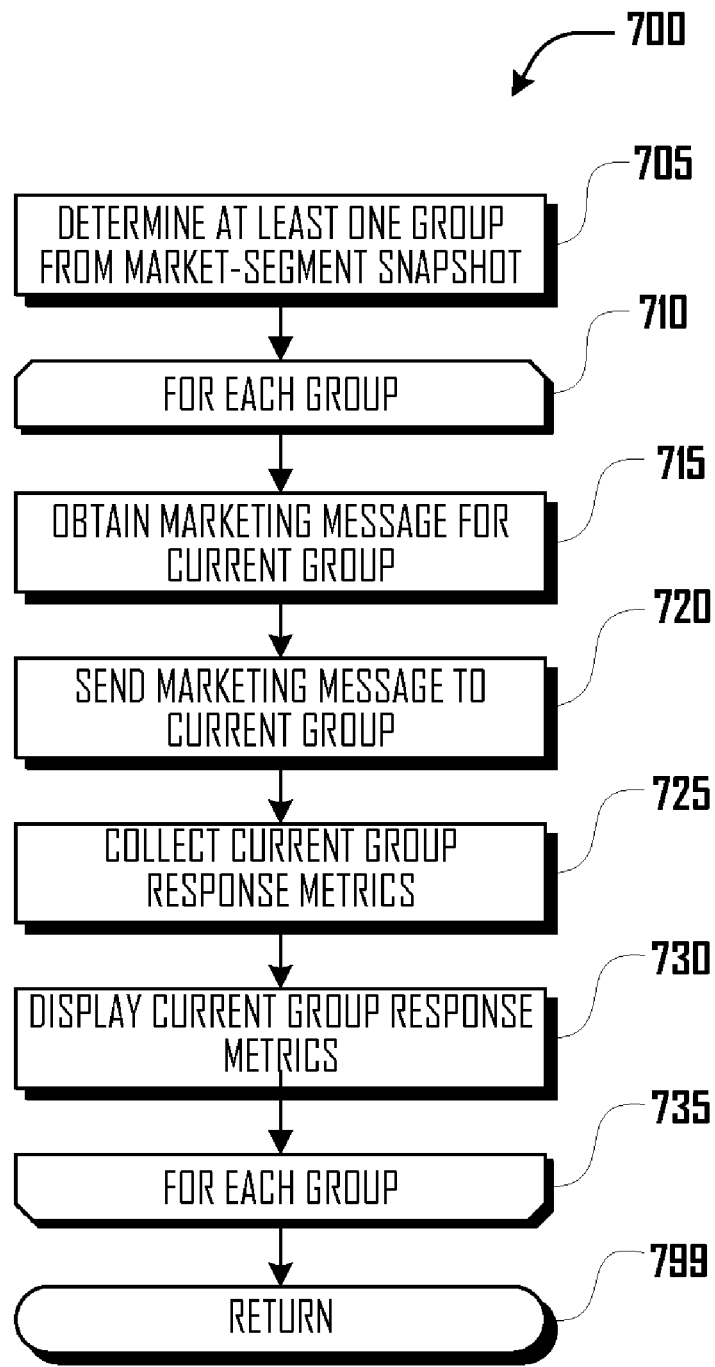
FIG. 7 is a flow diagram illustrating a dynamic marketing messaging subroutine in accordance with one embodiment.

FIG. 7 illustrates a dynamic marketing messaging subroutine 700 in accordance with one embodiment. In block 705, subroutine 700 determines at least one group of members from a market-segment snapshot. In some embodiments, there may be a single group including all members of the market-segment snapshot. In other embodiments, subroutine may determine two or more groups, each containing an exclusive sub-set of all members of the market-segment snapshot. When two or more groups are determined, subroutine may facilitate A/B (or A/B/C, or the like) testing of competing marketing messages, as discussed further below.

Beginning in block 710, subroutine 700 processes each determined group in turn. In block 715, subroutine 700 obtains a marketing message destined for the current group. In various embodiments, the marketing message may take electronic form (e.g., email, text message, web-based survey or other web page, and the like) and/or physical form (e.g., letter, postcard, flyer, brochure, pamphlet, and the like). In many cases, the marketing message may include one or more calls for the recipient to respond to the message. For example, the recipient may be called on to respond via email, visit a web page, respond via phone, return a physical and/or electronic survey form, purchase a product, and the like. In some cases, the call to respond may include a unique identifier associated with the recipient and/or the current group. In cases where two or more groups have been determined, each group may receive a distinct marketing message.

In block 720, subroutine 700 causes the current marketing message to be sent to the current group. In many cases, causing the current marketing message to be sent further includes customizing the marketing message for each recipient (e.g., via a mail-merge or similar operation). When the marketing message takes an electronic form, causing the current marketing message to be sent may further include transmitting to the recipient an electronic message including or referencing the marketing message. When the marketing message takes a physical form, causing the current marketing message to be sent may further include automatically printing the marketing message onto suitable media, automatically addressing the printed media, and/or automatically readying the printed media for pickup and delivery.

In block 725, subroutine 700 collects response metrics associated with the marketing messages sent to the current group. For example, subroutine 700 may track how many members of the current group act on each call to respond in the marketing message, such as by recording visits to a responsive web page, emails to a responsive address, calls to a responsive phone number, submissions of a responsive survey, and the like. In other embodiments, subroutine 700 may further track metrics such as which elements of a marketing message received the most clicks.

In block 730, subroutine 700 displays the collected response metrics for the current group. In cases where two or more groups have been determined, a marketer may use the displayed response metrics for each group to compare the efficacy of distinct marketing messages that were sent to different groups. In such cases, the marketer may use this information to tailor future marketing messages to potentially improve response rates to the same group or to other groups. In some embodiments, displaying the collected response metrics may include displaying a "heat map" illustrating which areas and/or elements of a marketing message received the most clicks from recipients.

In block 735, subroutine 700 cycles back to process the next group (if any). Subroutine 700 ends in block 799.

Figure 8:
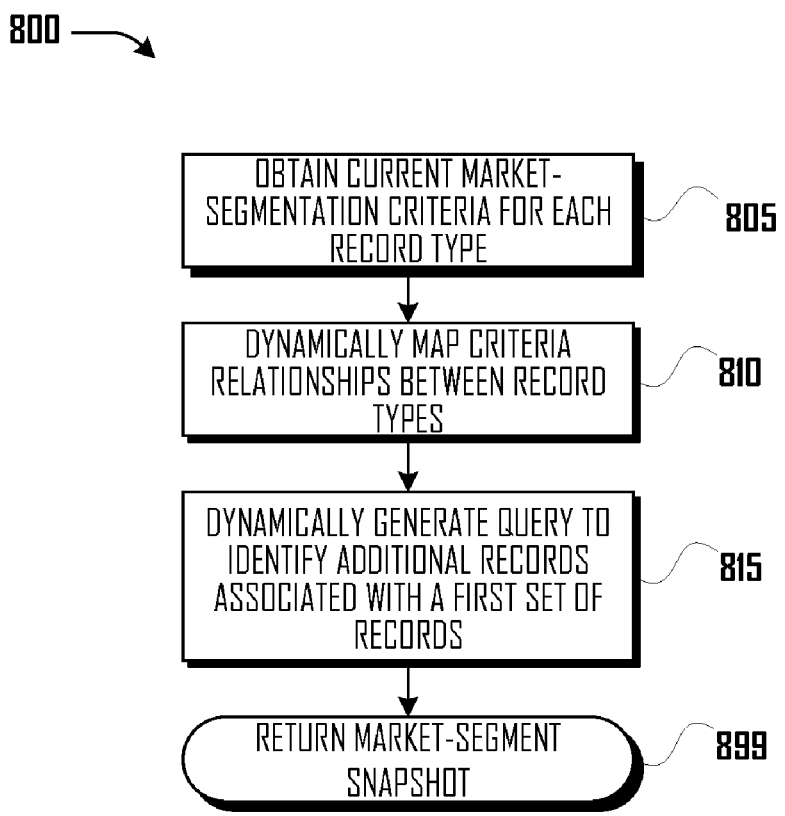
FIG. 8 is a flow diagram illustrating an automatic associated-query criteria subroutine in accordance with one embodiment.

FIG. 8 illustrates an automatic associated-query criteria subroutine 800 in accordance with one embodiment. In block 805, subroutine 800 obtains a list of current market-segmentation criteria for each currently-defined type of segmentable record in marketing database 1500. For example, in one embodiment, marketing database 1500 may include records corresponding to facilities and records corresponding to individuals. In this example, facilities records may include criteria (or fields) such as facility ID, facility name, facility address, number of beds, and the like. Similarly, individual records may include criteria (or fields) such as individual ID, individual name, individual address, job title, place of employment, and the like.

In block 810, subroutine 800 dynamically maps semantic relationships between criteria in different record types. For example, using the record types discussed immediately above, subroutine 800 may determine that the 'place of employment' criterion (of individual-records) may map to one or more facility IDs.

In block 815, subroutine 800 uses the dynamically-mapped relationships to generate a query to identify additional records associated with a first set of records. For example, if the first set of records consists of one or more facility-records, subroutine 800 may generate a query to identify one or more individual-records whose 'place of employment' criterion corresponds to facility IDs of the one or more facility-records in the first set. Subroutine 800 ends in block 899.

In one embodiment, to perform some or all of subroutine 800, a market-segmentation computer 200 may utilize an object-relational mapping solution such as Hibernate (developed by RedHat, Inc. of Raleigh, N.C.), NHibernate (developed by the open source community), Apache Cayenne (developed by the Apache Software Foundation of Forest Hill, Md.), and the like.

In most embodiments, the types of records and/or the criteria associated with each type of record may change periodically. Therefore, in most embodiments, it may be desirable to dynamically perform the mapping operations of subroutine 800 each time a market-segment snapshot is identified.

Figure 9:
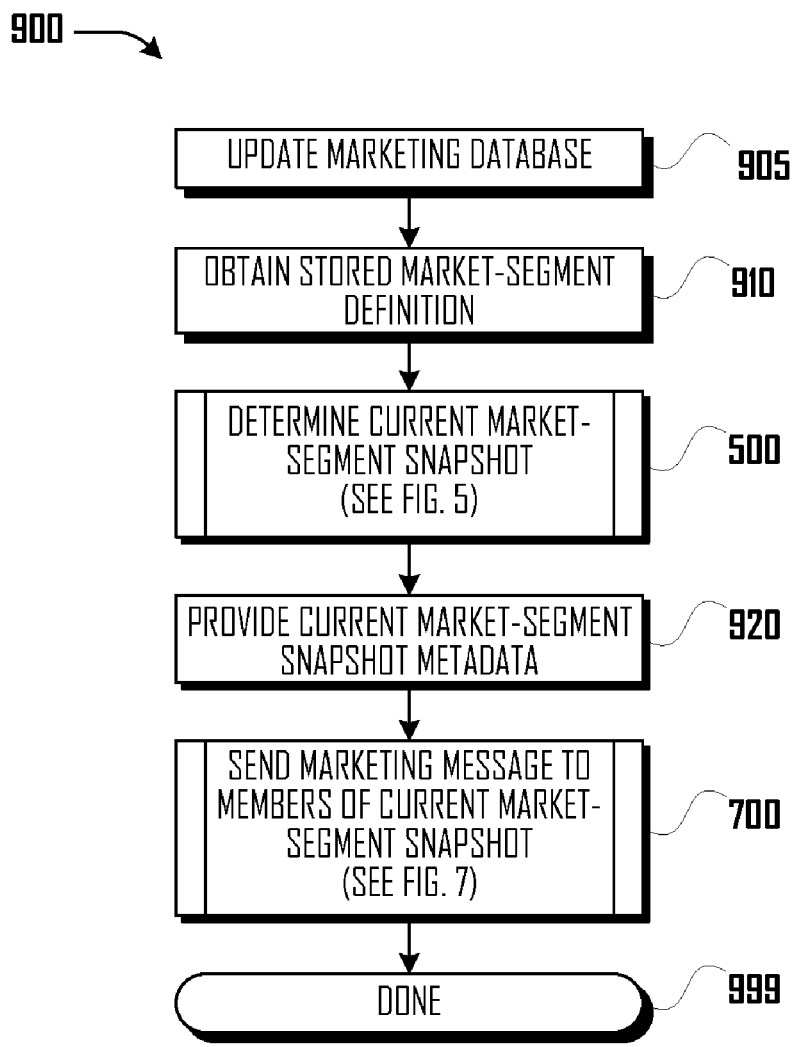
FIG. 9 is a flow diagram illustrating an updated market-segment snapshot routine in accordance with one embodiment.

FIG. 9 illustrates an updated market-segment snapshot routine 900 in accordance with one embodiment. In block 905, routine 900 updates marketing database 1500. For example, new records may be added to marketing database and/or data may be added, deleted, or otherwise modified in existing records. Additionally, in some cases, new record types may be introduced into marketing database 1500 and/or existing record types may be deleted or modified (i.e., segmentation criteria corresponding to a record type may be added, deleted, or otherwise modified).

In block 910, a previously-stored market-segment definition is obtained from a data store. In block 500, routine 900 performs subroutine 500 (see FIG. 5, discussed above) to determine a current market-segment snapshot according to the previously-stored market-segment definition. In block 920, routine 900 provides (for display in the marketer GUI 1600) meta-data 1620 associated with the current market-segmentation criteria (e.g., counts of various record types represented in the current snapshot). In block 700, routine 900 performs subroutine 700 (see FIG. 7, discussed above) to send one or more marketing messages to members of the current market-segment snapshot. Routine 900 ends in block 999.

Figure 10:
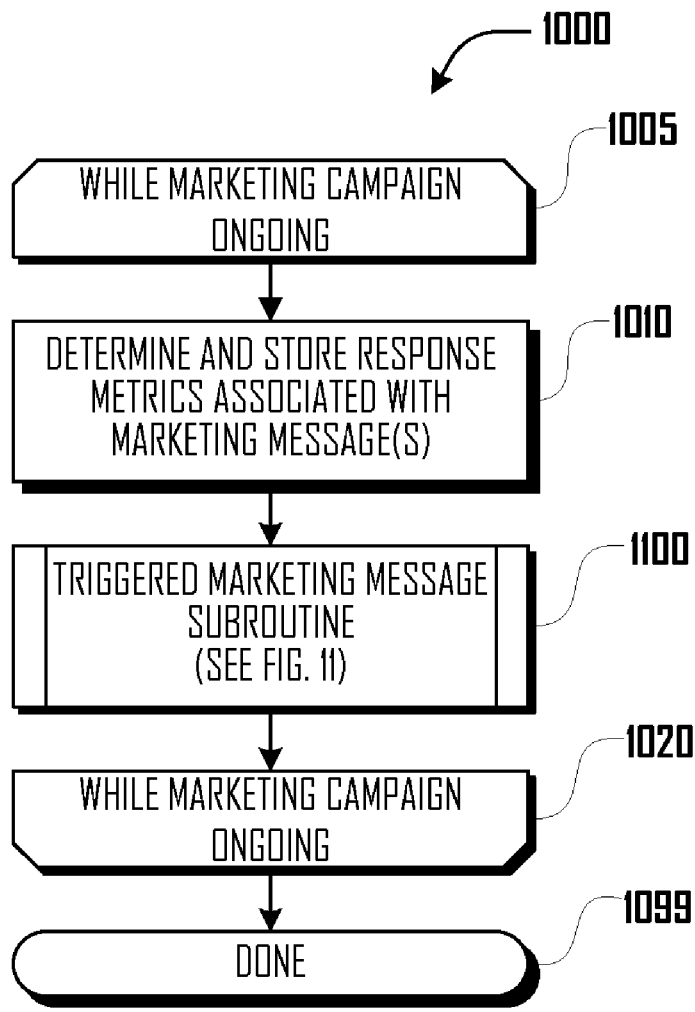
FIG. 10 is a flow diagram illustrating a dynamic life-cycle marketing routine in accordance with one embodiment.

FIG. 10 illustrates a dynamic life-cycle marketing routine 1000 in accordance with one embodiment. Beginning in block 1005, routine 1000 monitors a marketing campaign (comprising one or more marketing messages sent to members of one or more market-segment snapshots) while the campaign is ongoing. In block 1010, routine 1000 collects response metrics associated with one or more marketing messages in the campaign. For example, routine 1000 may track responses that are generated by the one or more marketing messages, such as by recording visits to a responsive web page, emails to a responsive address, calls to a responsive phone number, submissions of a responsive survey, and the like. In block 1100, routine 1000 performs subroutine 1100 (see FIG. 11, discussed below) to trigger one or more additional marketing messages in response to the collected response metrics. In block 1020, routine 1000 cycles back to block 1005 for the duration of the marketing campaign. Routine 1000 ends in block 1099.

Figure 11:
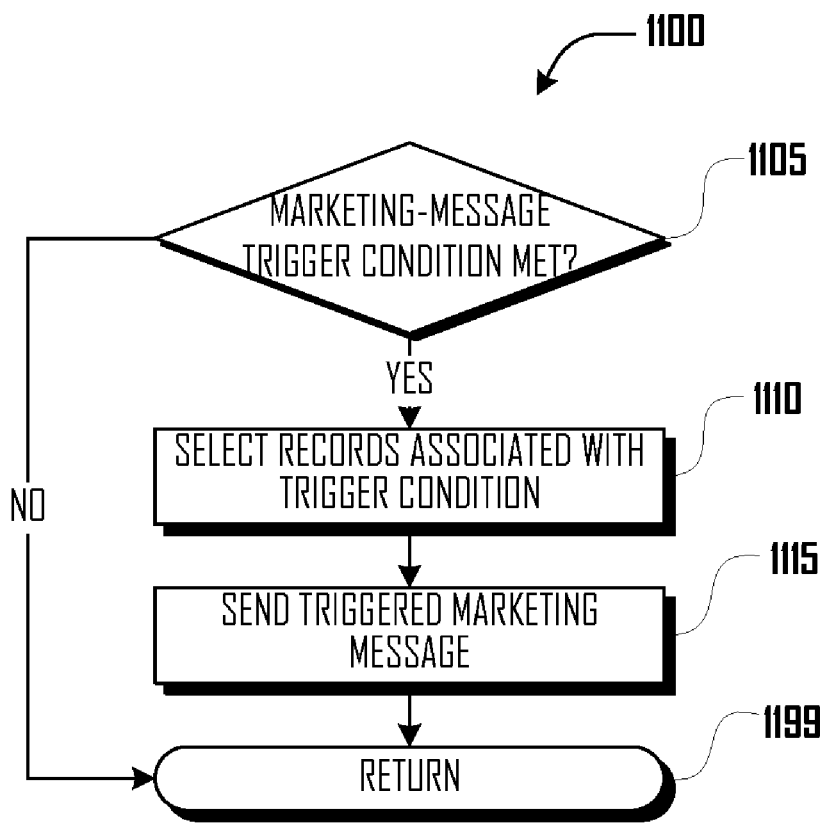
FIG. 11 is a flow diagram illustrating a triggered message subroutine in accordance with one embodiment.

FIG. 11 illustrates a triggered message subroutine 1100 in accordance with one embodiment. In decision block 1105, subroutine 1100 determines whether a trigger condition associated with a marketing campaign has been met. If subroutine 1100 determines that no trigger condition has been met, subroutine 1100 returns to the caller in block 1199. On the other hand, if subroutine 1100 determines that a trigger condition has been met, then subroutine 1100 in block 1110 selects one or more records associated with the trigger condition from marketing database 1500. In block 1115, subroutine 1100 sends one or more triggered messages to recipients associated with the selected records. In some embodiments, the triggered message may include a marketing message sent to a customer. In other embodiments, the triggered message may include a message sent to a sales department to follow up with a customer. In still other embodiments, the triggered message may include a message sent to a legal department, an accounting department, an external partner, and the like, instructing the recipient to follow up with a customer. Thus, in some embodiments, triggered message subroutine 1100 comprises a general messaging system in response to triggered events. Subroutine 1100 ends in block 1199.

For example, in some embodiments, triggered message subroutine 1100 may act as in the following illustrative scenario. In some embodiments, a recipient's response to a marketing message may act as a trigger condition, triggering a subsequent marketing message. For example, in some embodiments, subroutine 1100 may determine in block 1105 that a survey was completed in response to a previously-sent marketing message. In block 1110, subroutine 1100 may select a record associated with the particular recipient of the previously-sent marketing message. In block 1115, subroutine 1100 may further cause a subsequent marketing message to be sent to the particular recipient.

In another illustrative scenario, subroutine 1100 may determine in block 1105 that a certain amount of time has passed since a previous marketing message was sent to one or more recipients. In block 1110, subroutine 1100 may select one or more records associated with the recipient(s) of the previously-sent marketing message. In block 1115, subroutine 1100 may further cause a subsequent marketing message to be sent to the recipient(s) of the previously-sent marketing message.

In a similar illustrative scenario, subroutine 1100 may determine in block 1105 that a certain amount of time has passed since a previous marketing message was sent to a number of recipients and further that one or more of the recipients have not responded to the previous marketing message. In block 1110, subroutine 1100 may select records associated with the one or more non-responsive recipients. In block 1115, subroutine 1100 may further cause a subsequent marketing message to be sent to the non-responsive recipients.

In yet another illustrative scenario, subroutine 1100 may determine in block 1105 that a new record has been added to marketing database 1500, the new record matching a stored market-segment definition associated with an ongoing marketing campaign. In block 1110, subroutine 1100 may select the newly-added record. In block 1115, subroutine 1100 may cause a marketing message to be sent to a recipient associated with the newly-added record. (See also FIG. 12, discussed below.)

In other embodiments, other trigger conditions may be used in various manners to trigger marketing messages as various events are tracked in real time.

Figure 12:
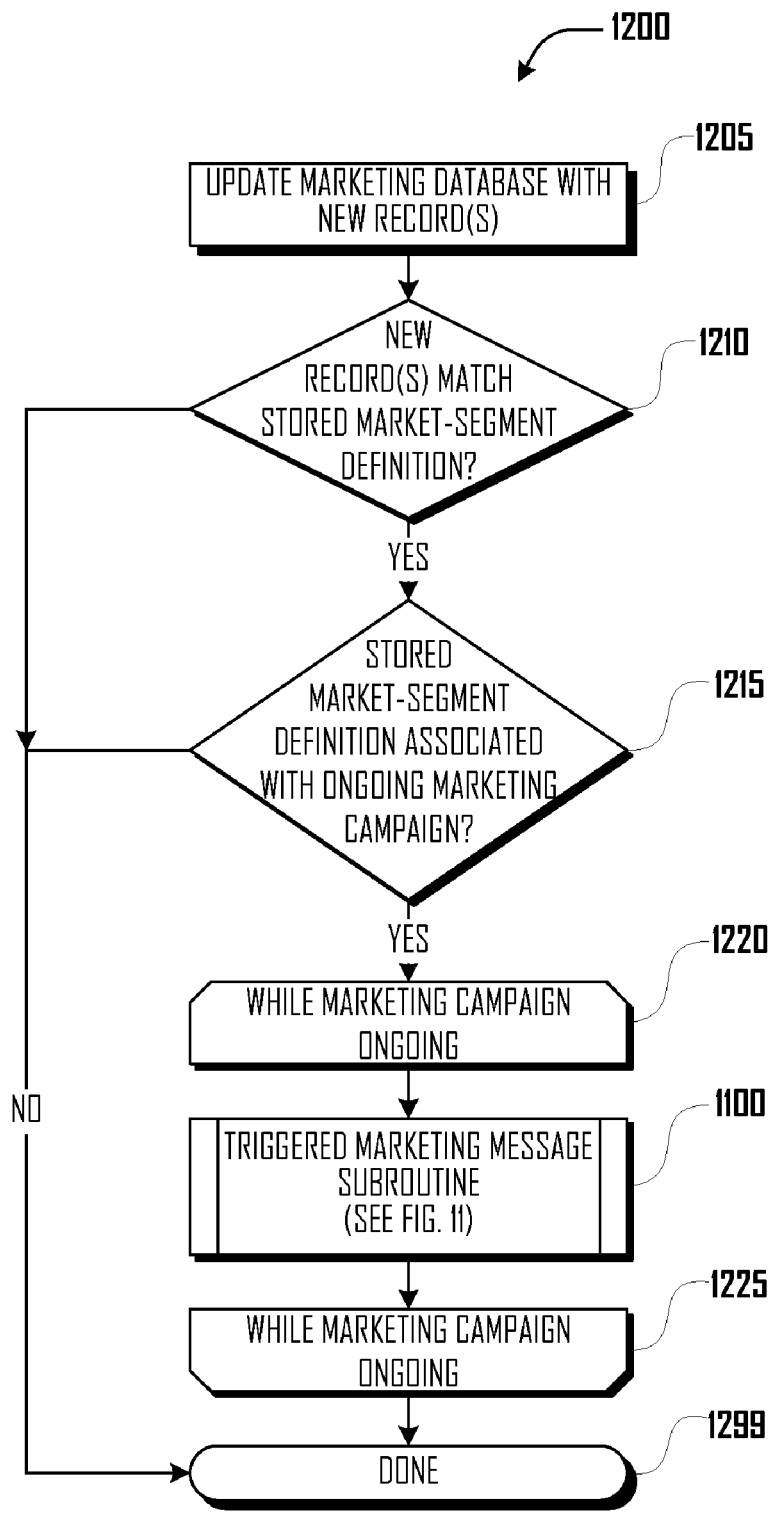
FIG. 12 is a flow diagram illustrating an ongoing marketing campaign update routine in accordance with one embodiment.

FIG. 12 illustrates a dynamic marketing campaign update routine 1200 in accordance with one embodiment. In block 1205, routine 1200 updates marketing database 1500. For example, new records may be added to marketing database 1500 and/or data may be added, deleted, or otherwise modified in existing records. Additionally, in some cases, new record types may be introduced into marketing database 1500 and/or existing record types may be deleted or modified (i.e., segmentation criteria corresponding to a record type may be added, deleted, or otherwise modified).

In decision block 1210, routine 1200 determines whether any of the newly added and/or modified records match any previously-stored market-segment definitions. If not, routine 1200 ends in block 1299. If, however, routine 1200 identifies a previously-stored market-segment definition that matches any of the newly added and/or modified records, then routine 1200 determines in decision block 1215 whether the identified market-segment definition is associated with an ongoing marketing campaign. If not, routine 1200 ends in block 1299. If, however, routine 1200 identifies an ongoing marketing campaign associated with the identified market-segment definition, then beginning in block 1220, routine 1200 monitors ongoing marketing events (e.g., responses to surveys, visits to responsive web pages, calls to responsive phone numbers, and the like) associated with the marketing campaign. In block 1100, routine 1200 performs subroutine 1100 (see FIG. 11, discussed above) to trigger marketing messages associated with the ongoing marketing campaign. While the marketing campaign is ongoing, subroutine cycles back to block 1220 from block 1225 to continue monitoring marketing events. Routine 1200 ends in block 1299.

Figure 13:
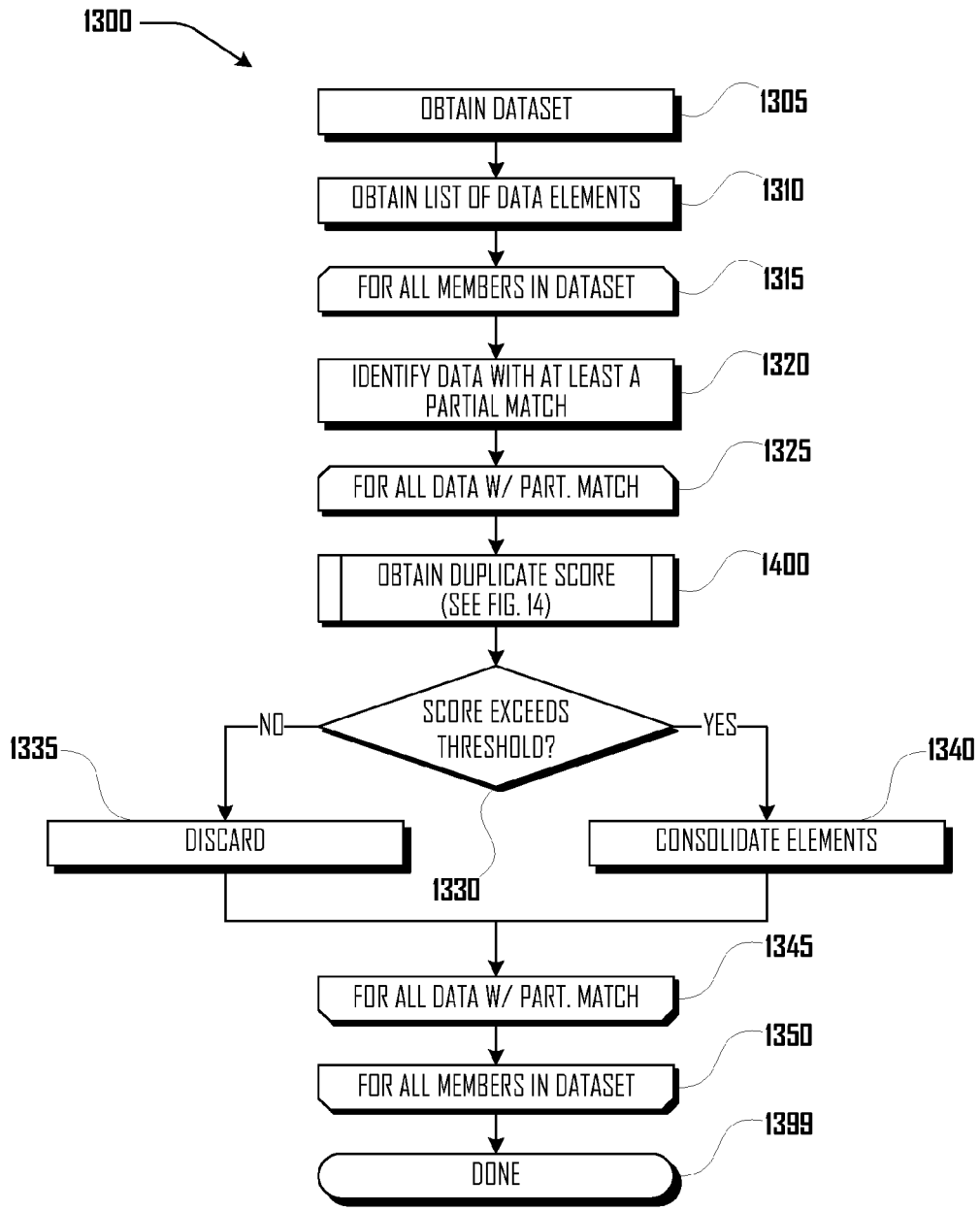
FIG. 13 is a flow diagram illustrating a fuzzy de-duplication routine in accordance with one embodiment.

FIG. 13 illustrates a fuzzy de-duplication routine 1300 in accordance with one embodiment. As used herein, "de-duplication" refers to identifying, removing, and consolidating duplicate records in a database system. In one embodiment, the de-duplication methods are applied to records in marketing database 1500. In other embodiments, similar methods may be applied to match records in marketing database 1500 to one or more industry truth data sources.

In block 1305, routine 1300 obtains a dataset including a number of records that may or may not contain duplicates. In one embodiment, the dataset may be obtained as part of updating marketing database 1500 with new records (see, e.g., FIGS. 9 and 12, discussed above).

In block 1310, routine 1300 obtains a list of data elements (referred to above as segmentation criteria) for members of the dataset. In one embodiment, for example, the data elements represent data stored in particular fields of one or more tables in marketing database 1500. In an exemplary embodiment, some or all of the following illustrative data elements may be selected for duplicate comparison:

First Name
Last Name
Email Address
Company
Title
City
State
Zip Code or Postal Code
Address Line 1
Address Line 2
Country
Role (e.g., Point of Care Coordinator, Nurse, Diabetes Educator, and the like)
Professional Designation (e.g., MD, PhD, MD/PhD, DO, and the like)

In alternative embodiments, the selected data elements may include more, fewer, and/or different elements.

Beginning in block 1315, routine 1300 evaluates each member in the obtained dataset. In block 1320, routine 1300 compares the current member's data elements with those of other members to identify members whose data elements at least partially match those of the current member. In one embodiment, the comparison includes determining an edit distance (e.g., the Levenshtein distance) between corresponding data elements. (An "edit distance" represents the number of edits required to convert one string to another string.) For example, in one embodiment, an Levenshtein distance of '1' may be determined between a First Name element of record 1 (e.g., "Steven") and the same element of record 2 (e.g., "Steve").

In one embodiment, an edit distance value below a threshold may result in the records being retained for more extensive processing as partial matches. In one embodiment, the threshold may be '4.' Exemplary thresholds disclosed herein were determined based on data from trade show participants in the medial equipment and supply industry, as well as industry truth sources (e.g., data from IMS Health Incorporated of Norwalk Conn., Health Market Science of King of Prussia, Pa., and the like), and other third-party data sources. In other embodiments, other threshold values may be more appropriate. Conversely, any index above the threshold may result in the records being treated as non-matching (so no further de-duplication operations may be performed).

Once one or more sets of partially-matching records have been identified, routine 1300 processes the partially-matching records beginning in block 1325. In block 1400, routine 1300 obtains a fuzzy duplication score by performing subroutine 1400 (see FIG. 14, discussed below).

In decision block 1330, routine 1300 compares the fuzzy duplication score to a threshold. If the score is below the threshold, routine 1300 treats the partially-matching records as non-matches and discards them in block 1335 from further de-duplication operations. In one embodiment, the fuzzy duplication score threshold is set to '5.' In other embodiments, other thresholds may be more appropriate.

If the fuzzy duplication score is above the threshold, in block 1340, routine 1300 may consolidate the partially-matching records into a single record. In one embodiment, the data elements from the partially-matching records may be merged. For example, if one record contains a company name and an address, and another record contains a contact name and a company name (but no address information) then the two partially-matching Records 1 and 2 may be merged in a manner similar to the following.

Record 1
First Name="Christopher"
Last Name="Hahn"
Company="Appature"
City=(null)
State="Washington"
Zip Code=(null)
Address Line 1=(null)
Address Line 2=(null)
Record 2
First Name=(null)
Last Name=(null)
Company="Appature Inc."
City="Seattle"
State="WA"
Zip Code="98104"
Address Line 1="730 3rd Avenue"
Address Line 2="23rd Floor"
Consolidated Record
First Name="Christopher"
Last Name="Hahn"
Company="Appature Inc."
City="Seattle"
State="WA"
Zip Code="98104"
Address Line 1="730 3rd Avenue"
Address Line 2="23rd Floor"

In one embodiment, the fields from the partially-matching Records 1 and/or 2 may be retained in the history of the consolidated record and flagged with an indicator such as "conversion" or "consolidated." In alternative embodiments, the operator may be prompted when duplicates are found, or any number of alternative methods of consolidation may be employed. In one embodiment, if multiple duplicates are identified, then the duplicate with the highest fuzzy duplication score may be retained.

In block 1345, routine 1300 cycles back to block 1325 to process further partially-matching records. In block 1350, routine 1300 cycles back to block 1315 to process the next record in the obtained dataset. Routine 1300 ends in block 1399.

Figure 14:
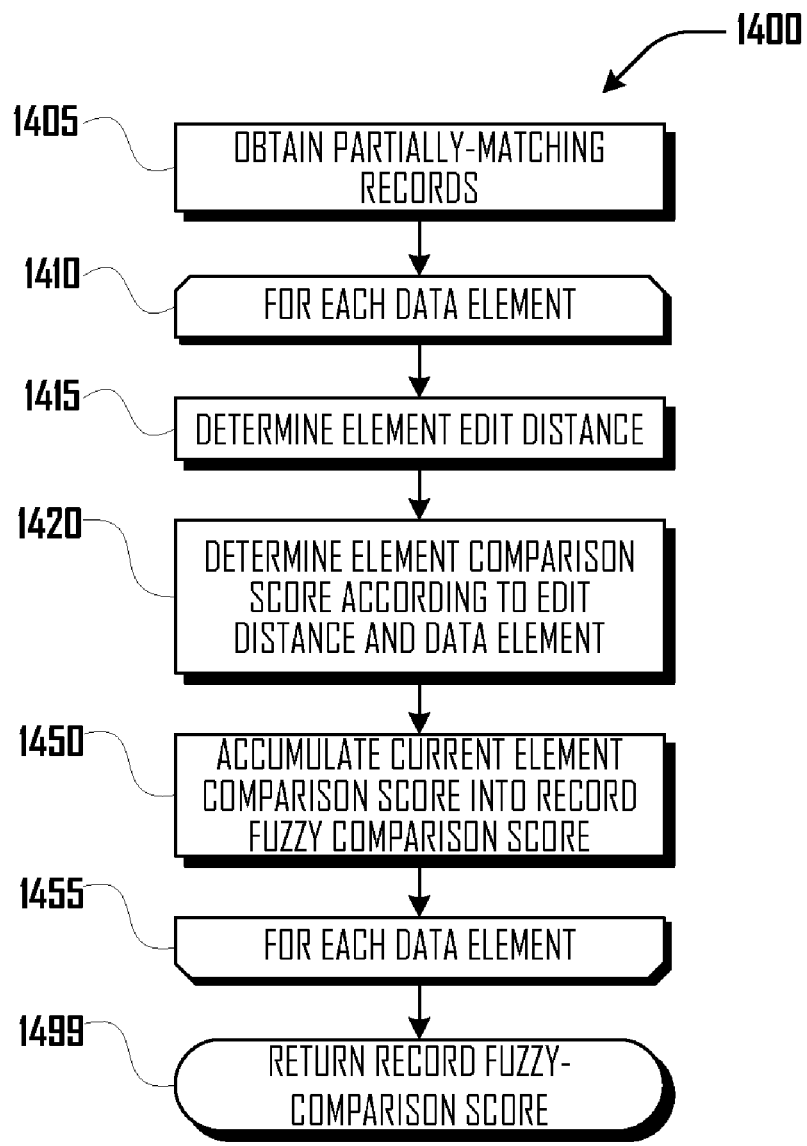
FIG. 14 is a flow diagram illustrating a fuzzy comparison score subroutine in accordance with one embodiment.

FIG. 14 illustrates a fuzzy comparison score subroutine 1400 in accordance with one embodiment. In block 1405, subroutine 1400 obtains first and second partially-matching records. In block 1410, subroutine 1400 processes each data element of the partially-matching records. In one embodiment, the elements consist of fields of contact records, such as a First Name, a Last Name, a Company, and the like.

In block 1415, subroutine 1400 determines an edit distance (e.g. a Levenshtein distance) between data elements (e.g., 'First Name' fields) in the partially-matching records. In other embodiments, other distance algorithms may be applied, either on a one-to-one basis or, in other embodiments, a many-to-one or many-to-many configuration.

In decision block 1420, subroutine 1400 determines a comparison score for the current data element according to the determined edit distance, as well as the data elements being compared. In one embodiment, a particular data element may be assigned to one of several predetermined comparison score values, selected according to how close the elements being compared are deemed to mach. For example, data elements in a record of a type associated with an individual may receive a comparison score according to Table 1.

TABLE 1

Element comparison scores by data element and edit distance

| Data element | "Perfect match" | "Partial match" | "No match" |
| --- | --- | --- | --- |
| First Name | 1.0 | 0.5 | −1.5 |
| Last Name | 1.0 | 0.5 | −2.5 |
| Email | 2.5 | 0.0 | 0 |
| Company | 0.8 | 0.4 | 0 |
| Title | 0.4 | 0.2 | 0 |
| City | 0.8 | 0.4 | 0 |
| State | 0.8 | 0.4 | 0 |
| Zip Code | 2.0 | 1.0 | 0 |
| Phone | 2.5 | 1.25 | 0 |
| Address Line 1 | 2.0 | 1.0 | 0 |
| Address Line 2 | 1.0 | 0.5 | 0 |

Using the exemplary Table 1, when comparing the 'First Name' data elements of two partially-matching records, subroutine 1400 would assign an element comparison score of '1.0' if the 'First Name' fields were deemed a "perfect" match (according to the edit distance determined in block 1415), '0.5' if the fields were deemed a "partial" match, and '−1.5' if the fields were deemed not to match. Similarly, when comparing the 'Email' data elements of two partially-matching records, subroutine 1400 would assign an element comparison score of '2.5' if the 'Email' fields were deemed a "perfect" match, '0' if the fields were deemed a "partial" match, and '0' if the fields were deemed not to match. For other record types and/or record types having different data elements than those illustrated, a different comparison score table may be used.

In one embodiment, subroutine 1400 uses a series of edit distance thresholds to determine whether two data elements are deemed "perfect," "partial," or "no" matches. For example, if the edit distance between two data elements is less than or equal to a perfect-match threshold (e.g., '0' or '1'), the data elements may be deemed a "perfect" match; else if the edit distance is less than a partial-match threshold (e.g., '4'), the data elements may be deemed a "partial" match; otherwise, the data elements may be deemed a "no" match.

In block 1450, subroutine 1400 accumulates the comparison score determined for the current data element into a fuzzy-comparison score for the partially-matching records. In block 1455, subroutine 1400 cycles back to block 1410 to process the next data element (if any). Once subroutine 1400 has processed all data elements, the fuzzy-comparison score for the partially-matching records will essentially be the sum of all data element comparison scores for the records, and subroutine 1400 ends in block 1499, returning the fuzzy-comparison score for the partially-matching records to the caller.

Figure 15:
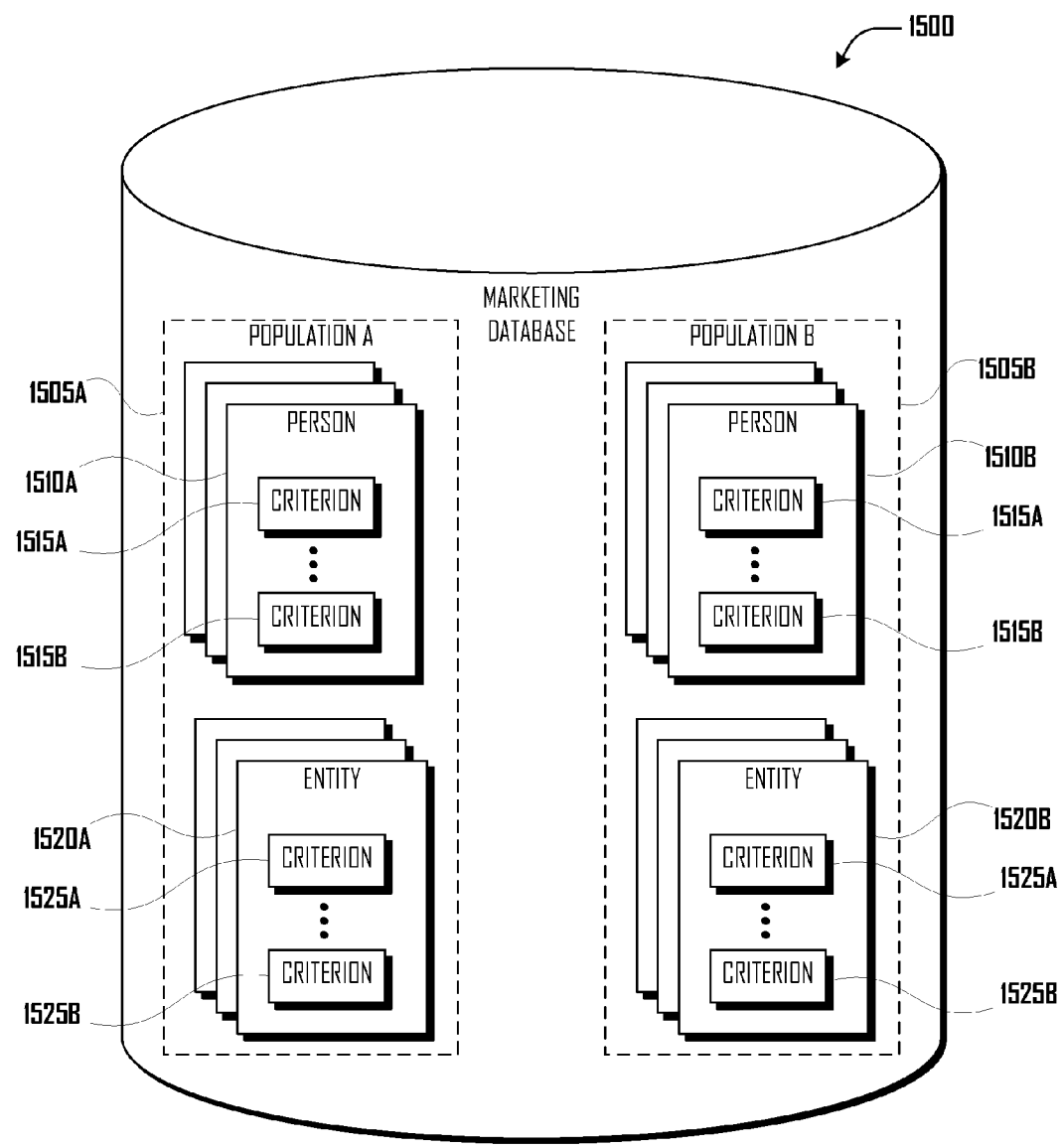
FIG. 15 illustrates an exemplary marketing database in accordance with one embodiment.

FIG. 15 illustrates an exemplary marketing database 1500 in accordance with one embodiment. The illustrated marketing database 1500 includes two populations 1505A-B of records or members. As used herein, the term "population" simply refers to a group of records, typically a group that exists in or is added to marketing database 1500 at a particular time. For example, on day one, marketing database 1500 may include a first population 1505A of records, and on day two a second population 1505B of records may be added to marketing database 1500.

The illustrated marketing database 1500 includes records of an exemplary person-type 1510A-B (e.g., records that typically represent an individual person) and records of an exemplary entity-type 1520A-B (e.g., records that typically represent non-individual-person entities). See also FIG. 3, discussed above, for a further discussion of person-type records versus entity-type records. Person-type records 1510A-B include a number of person-related market segmentation criteria 1515A-B. Entity-type records 1520A-B include a number of entity-related market segmentation criteria 1525A-B. (Market-segmentation criteria, whether related to person, entity, or any other record type, are also referred to herein as data elements or fields.) In other embodiments, marketing database 1500 may include additional record types. Moreover, in some embodiments, marketing database 1500 may include more than one type of record that could be considered person-type records (e.g., contact records, lead records, customer records, and the like). Similarly, in some embodiments, marketing database 1500 may include more than one type of record that could be considered entity-type records (e.g., facility records, industry-association records, customer records, and the like).

Figure 16:
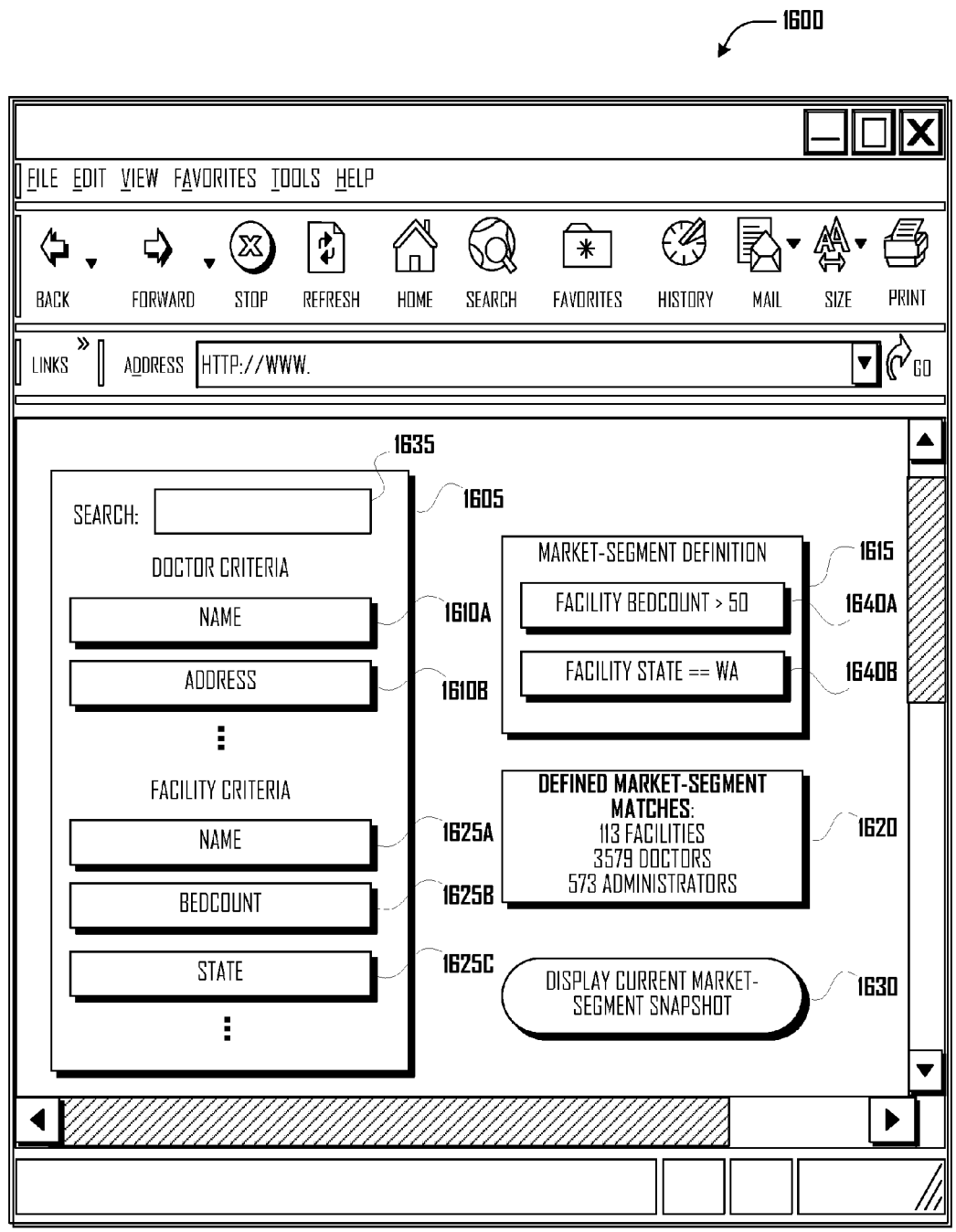
FIG. 16 illustrates an exemplary reduced-complexity marketer graphical user interface ("GUI") in accordance with one embodiment.

FIG. 16 illustrates an exemplary reduced-complexity marketer graphical user interface ("GUI") 1600 in accordance with one embodiment. Marketer GUI 1600 includes a searchable list 1605 of market-segmentation criteria, including criteria 1610A-B for "doctor"-type records (i.e., person-type records) and criteria 1625A-C for "facility"-type records (i.e., entity-type records). No search term is entered in search box 1635. If, however, a user entered a search term (e.g., "name") in box 1635, the list of displayed criteria might include only criteria 1610A and 1625A (doctor name and facility name criteria, respectively).

Marketer GUI 1600 also includes a list 1615 of selected market-segmentation criteria 1640A-B that make up a market-segment definition. In the illustrated example, a marketer has selected two facility criteria 1640A-B and entered desired values for the selected criteria. In one embodiment, a marketer may select market-segmentation criteria 1640A-B for a market-segment definition by dragging a criterion from searchable list 1605 to market-segment-definition list 1615. In other embodiments, a marketer may select market-segmentation criteria by selecting check boxes (not shown) or according to any other method of selection.

Marketer GUI 1600 also includes a market-segment-definition metadata display 1620, which shows information about the market-segment defined by the currently-selected market-segmentation criteria 1640A-B. In the illustrated example, metadata display 1620 shows that marketing database 1500 currently includes 113 facility-type records that match the marketer-specified criteria (i.e., facilities in Washington with a bed count greater than 50). In addition, metadata display 1620 shows that marketing database 1500 currently includes a number of records that are associated with the 113 facility-type records, namely 3579 doctor-type records and 573 administrator-type records. In one embodiment, when the marketer adjusts the market-segment definition, the metadata display 1620 may be updated automatically in real-time or near-real-time, thereby enabling the marketer to home in on a desirable market-segment rapidly. Marketer GUI 1600 also includes a control 1630 to display all or part of a current snapshot of the defined market segment.

Figure 17:
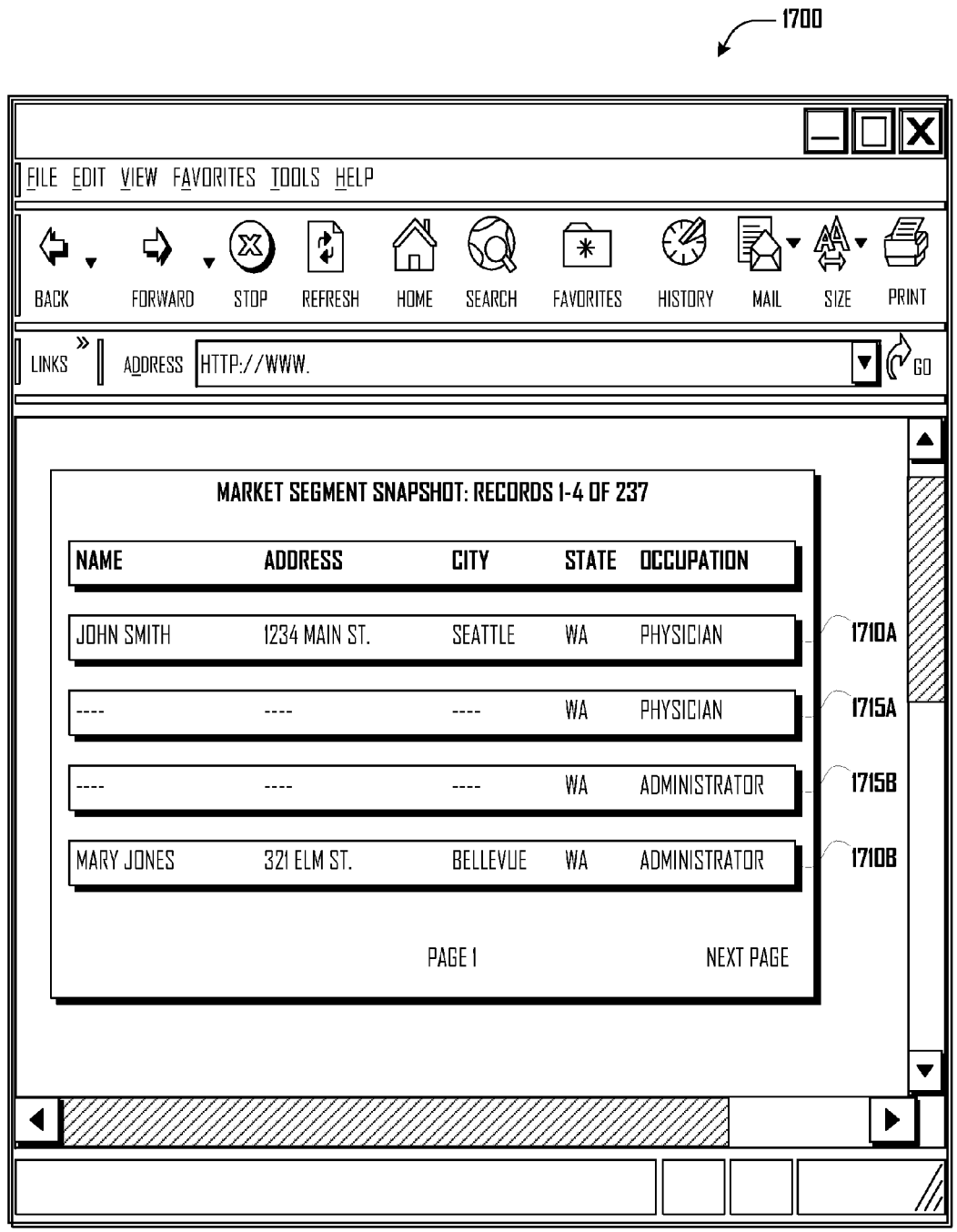
FIG. 17 illustrates an exemplary market-segment snapshot GUI in accordance with one embodiment.

FIG. 17 illustrates an exemplary market-segment snapshot GUI 1700 in accordance with one embodiment. Market-segment snapshot GUI 1700 includes a partial display of non-anonymized records 1710A-B and anonymized records 1715A-B.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

We claim:
1. A method of reduced-complexity access to marketing data, the method being implemented by a market-segmentation computer communicatively coupled to a database server and a marketer terminal, the database server hosting a marketing database populated with a first population including a plurality of person records and a plurality of entity records, each of the plurality of person records comprising data corresponding to a plurality of person-related market-segmentation criteria, each of the plurality of entity records comprising data corresponding to a plurality of entity-related market-segmentation criteria, the method comprising:
    providing, by the market-segmentation computer to a reduced-complexity marketer GUI displayed at the marketer terminal, a searchable list of the person-related and entity-related pluralities of market-segmentation criteria;
    obtaining, by the market-segmentation computer from the marketer terminal via said reduced-complexity marketer GUI, a market-segment definition comprising at least one search key corresponding to a selected criterion from among the person-related and entity-related pluralities of market-segmentation criteria;
    performing steps i-iii, by the market-segmentation computer in communication with the database server, to obtain a first market-segment snapshot:
        i) identifying, in a current population of the marketing database, a first set of records corresponding to said market-segment definition;
        ii) automatically determining a plurality of query criteria to identify additional records in said current popula- tion of the marketing database, said additional records being associated with members of said first set of records; and iii) identifying a second set of records according to said automatically-determined plurality of query criteria, the first and second sets of records comprising a current market-segment snapshot corresponding to said market-segment definition and said current population of the marketing database;

providing, by the market-segmentation computer to the marketer terminal for display in said reduced-complexity marketer GUI, a summary including metadata corresponding to said first market-segment snapshot;

storing, by the market-segmentation computer in communication with the database server, a reusable dynamic-market-segment definition corresponding to said market-segment definition; and updating the marketing database, by the market-segmentation computer in communication with the database server, with at least a selected one of a new person-related market-segmentation criterion and a new entity-related market-segmentation criterion;

wherein automatically determining query criteria to identify additional records in said current population of the marketing database comprises:
obtaining a current set of person-related market-segmentation criteria;
obtaining a current set of entity-related market-segmentation criteria;
dynamically identifying at least one mapping between a first criterion from among said current set of person-related market-segmentation criteria and a second criterion from among said current set of entity-related market-segmentation criteria;
automatically generating a query to identify said additional records according to said dynamically identified at least one mapping.

2. The method of claim 1, further comprising:
updating, by the market-segmentation computer in communication with the database server, the marketing database with a second population including a second plurality of person records and a second plurality of entity records;
obtaining, by the market-segmentation computer from the database-management computer, said reusable dynamic-market-segment definition;
performing steps i-iii, by the market-segmentation computer in communication with the database server, to obtain a second market-segment snapshot according to said stored market-segment definition and a current population of the marketing database, said second market-segment snapshot differing from said first market-segment snapshot.

3. The method of claim 2, further comprising the market-segmentation computer causing a marketing message to be communicated to individuals associated with a majority of records of said second market-segment snapshot.

4. The method of claim 3, further comprising:
automatically determining, by the market-segmentation computer on an ongoing basis, a plurality of response metrics associated with said marketing message; and
after a pre-determined period of time:
automatically selecting, by the market-segmentation computer according to said plurality of response metrics, at least one non-responsive record of said majority of records; and automatically causing, by the market-segmentation computer, a second marketing message to be communicated to individuals associated with said selected at least one non-responsive record.

5. The method of claim 2, further comprising:
automatically selecting, by the market-segmentation computer, first and second subsets of records from said second market-segment snapshot;
causing, by the market-segmentation computer, a first marketing message to be communicated to individual persons associated with a majority of records of said first subset of records of said second market-segment snapshot; and
causing, by the market-segmentation computer, a second marketing message to be communicated to individual persons associated with a majority of records of said second subset of records of said second market-segment snapshot.

6. The method of claim 5, further comprising:
automatically determining, by the market-segmentation computer, a first and a second plurality of response metrics associated with said first and second marketing messages; and
updating, by the market-segmentation computer in communication with the database server, the marketing database according to said first and second pluralities of response metrics.

7. The method of claim 6, further comprising providing, by the market-segmentation computer to the marketer terminal for display in said reduced-complexity marketer GUI, a reporting display graphically depicting a comparison of said first and said second plurality of response metrics.

8. The method of claim 1, further comprising:
updating, by the market-segmentation computer in communication with the database server, the marketing database with a second population including a particular record;
automatically determining, by the market-segmentation computer in communication with the database server, that said particular record corresponds to said stored dynamic-market-segment definition;
automatically identifying, by the market-segmentation computer, an ongoing marketing campaign associated with said stored dynamic-market-segment definition; and
automatically causing, by the market-segmentation computer, a first marketing message associated with said ongoing marketing campaign to be communicated to an individual associated with said particular record.

9. The method of claim 8, further comprising:
determining, by the market-segmentation computer in communication with the database server, the occurrence of a triggering event associated with said ongoing marketing campaign and said particular record; and
in response to the determined occurrence, automatically causing, by the market-segmentation computer, a second marketing message associated with said ongoing marketing campaign to be communicated to an individual associated with said particular record.

10. The method of claim 9, wherein said triggering event comprises a lapse of time since said updating the marketing database with said second population including said particular record.

11. The method of claim 1, further comprising:
selecting, by the market-segmentation computer, a plurality of records of said first market-segment snapshot for display;

identifying, by the market-segmentation computer, at least one person record among said selected plurality of records;

determining, by the market-segmentation computer, that said at least one person record satisfies a restricted-identification criterion;

anonymizing, by the market-segmentation computer, identifying data corresponding to said at least one person record;

providing, by the market-segmentation computer to the marketer terminal for display in said reduced-complexity marketer GUI, a market segment display listing data corresponding to said selected plurality of records, including said anonymized identifying data.

12. The method of claim 11, further comprising causing, by the market-segmentation computer, a personalized marketing message to be communicated to said identified at least one person, having provided only anonymized identifying data for display in said reduced-complexity marketer GUI.

13. The method of claim 1, further comprising:
identifying in said first population at least two records having at least partially matching data;
determining a duplication score for said at least two records;
determining that said duplication score exceeds a predetermined threshold; and
consolidating said at least two records into a consolidated record.

14. The method of claim 13, wherein said determining a duplication score for said at least two records comprises:
for each market-segmentation criterion shared between said at least two records:
classifying the current shared market-segmentation criterion into a similarity class selected from at least a perfect-match class, a partial-match class, and a no-match class;
selecting a match-score for the current shared market-segmentation criterion according to said classified similarity class and the current shared market-segmentation criterion; and
accumulating said selected match-score into the duplication score for said at least two records.

15. A non-transient computer-readable storage medium including instructions that, when executed by a processor, configure the processor to perform a method of reduced-complexity access to marketing data, the method being implemented by a market-segmentation computer communicatively coupled to a database server and a marketer terminal, the database server hosting a marketing database populated with a first population including a plurality of person records and a plurality of entity records, each of the plurality of person records comprising data corresponding to a plurality of person-related market-segmentation criteria, each of the plurality of entity records comprising data corresponding to a plurality of entity-related market-segmentation criteria, the method comprising:
providing, by the market-segmentation computer to a reduced-complexity marketer GUI displayed at the marketer terminal, a searchable list of the person-related and entity-related pluralities of market-segmentation criteria;
obtaining, by the market-segmentation computer from the marketer terminal via said reduced-complexity marketer GUI, a market-segment definition comprising at least one search key corresponding to a selected criterion from among the person-related and entity-related pluralities of market-segmentation criteria;

performing steps i-iii, by the market-segmentation computer in communication with the database server, to obtain a first market-segment snapshot:
i) identifying, in a current population of the marketing database, a first set of records corresponding to said market-segment definition;
ii) automatically determining a plurality of query criteria to identify additional records in said current population of the marketing database, said additional records being associated with members of said first set of records; and
iii) identifying a second set of records according to said automatically-determined plurality of query criteria, the first and second sets of records comprising a current market-segment snapshot corresponding to said market-segment definition and said current population of the marketing database;

providing, by the market-segmentation computer to the marketer terminal for display in said reduced-complexity marketer GUI, a summary including metadata corresponding to said first market-segment snapshot;

storing, by the market-segmentation computer in communication with the database server, a reusable dynamic-market-segment definition corresponding to said market-segment definition; and updating the marketing database, by the market-segmentation computer in communication with the database server, with at least a selected one of a new person-related market-segmentation criterion and a new entity-related market-segmentation criterion;

wherein automatically determining query criteria to identify additional records in said current population of the marketing database comprises:
obtaining a current set of person-related market-segmentation criteria;
obtaining a current set of entity-related market-segmentation criteria;
dynamically identifying at least one mapping between a first criterion from among said current set of person-related market-segmentation criteria and a second criterion from among said current set of entity-related market-segmentation criteria;
automatically generating a query to identify said additional records according to said dynamically identified at least one mapping.

16. A computing apparatus comprising a processor and a storage medium including instructions that, when executed by the processor, configure the apparatus to perform a method of reduced-complexity access to marketing data, the method being implemented by a market-segmentation computer communicatively coupled to a database server and a marketer terminal, the database server hosting a marketing database populated with a first population including a plurality of person records and a plurality of entity records, each of the plurality of person records comprising data corresponding to a plurality of person-related market-segmentation criteria, each of the plurality of entity records comprising data corresponding to a plurality of entity-related market-segmentation criteria, the method comprising:
providing, by the market-segmentation computer to a reduced-complexity marketer GUI displayed at the marketer terminal, a searchable list of the person-related and entity-related pluralities of market-segmentation criteria;
obtaining, by the market-segmentation computer from the marketer terminal via said reduced-complexity marketer GUI, a market-segment definition comprising at least one search key corresponding to a selected criterion from among the person-related and entity-related pluralities of market-segmentation criteria;

performing steps i-iii, by the market-segmentation computer in communication with the database server, to obtain a first market-segment snapshot:
  i) identifying, in a current population of the marketing database, a first set of records corresponding to said market-segment definition;
  ii) automatically determining a plurality of query criteria to identify additional records in said current population of the marketing database, said additional records being associated with members of said first set of records; and
  iii) identifying a second set of records according to said automatically-determined plurality of query criteria, the first and second sets of records comprising a current market-segment snapshot corresponding to said market-segment definition and said current population of the marketing database;

providing, by the market-segmentation computer to the marketer terminal for display in said reduced-complexity marketer GUI, a summary including metadata corresponding to said first market-segment snapshot;

storing, by the market-segmentation computer in communication with the database server, a reusable dynamic-market-segment definition corresponding to said market-segment definition; and updating the marketing database, by the market-segmentation computer in communication with the database server, with at least a selected one of a new person-related market-segmentation criterion and a new entity-related market-segmentation criterion;

wherein automatically determining query criteria to identify additional records in said current population of the marketing database comprises:
  obtaining a current set of person-related market-segmentation criteria;
  obtaining a current set of entity-related market-segmentation criteria;
  dynamically identifying at least one mapping between a first criterion from among said current set of person-related market-segmentation criteria and a second criterion from among said current set of entity-related market-segmentation criteria;
  automatically generating a query to identify said additional records according to said dynamically identified at least one mapping.

17. A method of reduced-complexity access to marketing data, the method being implemented by a market-segmentation computer communicatively coupled to a database server and a marketer terminal, the database server hosting a marketing database populated with a first population including a plurality of person records and a plurality of entity records, each of the plurality of person records comprising data corresponding to a plurality of person-related market-segmentation criteria, each of the plurality of entity records comprising data corresponding to a plurality of entity-related market-segmentation criteria, the method comprising:
  providing, by the market-segmentation computer to a reduced-complexity marketer GUI displayed at the marketer terminal, a searchable list of the person-related and entity-related pluralities of market-segmentation criteria;
  obtaining, by the market-segmentation computer from the marketer terminal via said reduced-complexity marketer GUI, a market-segment definition comprising at least one search key corresponding to a selected criterion from among the person-related and entity-related pluralities of market-segmentation criteria;

performing steps i-iii, by the market-segmentation computer in communication with the database server, to obtain a first market-segment snapshot:
  i) identifying, in a current population of the marketing database, a first set of records corresponding to said market-segment definition;
  ii) automatically determining a plurality of query criteria to identify additional records in said current population of the marketing database, said additional records being associated with members of said first set of records; and
  iii) identifying a second set of records according to said automatically-determined plurality of query criteria, the first and second sets of records comprising a current market-segment snapshot corresponding to said market-segment definition and said current population of the marketing database;

providing, by the market-segmentation computer to the marketer terminal for display in said reduced-complexity marketer GUI, a summary including metadata corresponding to said first market-segment snapshot;

storing, by the market-segmentation computer in communication with the database server, a reusable dynamic-market-segment definition corresponding to said market-segment definition;

identifying in said first population at least two records having at least partially matching data;

determining a duplication score for said at least two records;

determining that said duplication score exceeds a predetermined threshold; and consolidating said at least two records into a consolidated record;

wherein said determining a duplication score for said at least two records comprises:
  for each market-segmentation criterion shared between said at least two records:
    classifying the current shared market-segmentation criterion into a similarity class selected from at least a perfect-match class, a partial-match class, and a no-match class;
    selecting a match-score for the current shared market-segmentation criterion according to said classified similarity class and the current shared market-segmentation criterion; and
    accumulating said selected match-score into the duplication score for said at least two records.

18. The method of claim 17, further comprising:

updating, by the market-segmentation computer in communication with the database server, the marketing database with a second population including a second plurality of person records and a second plurality of entity records;

obtaining, by the market-segmentation computer from the database-management computer, said reusable dynamic-market-segment definition;

performing steps i-iii, by the market-segmentation computer in communication with the database server, to obtain a second market-segment snapshot according to said stored market-segment definition and a current population of the marketing database, said second market-segment snapshot differing from said first market-segment snapshot.

19. The method of claim 18, further comprising the market-segmentation computer causing a marketing message to be communicated to individuals associated with a majority of records of said second market-segment snapshot.

20. The method of claim 19, further comprising:
automatically determining, by the market-segmentation computer on an ongoing basis, a plurality of response metrics associated with said marketing message; and
after a pre-determined period of time:
automatically selecting, by the market-segmentation computer according to said plurality of response metrics, at least one non-responsive record of said majority of records; and
automatically causing, by the market-segmentation computer, a second marketing message to be communicated to individuals associated with said selected at least one non-responsive record.

21. The method of claim 18, further comprising:
automatically selecting, by the market-segmentation computer, first and second subsets of records from said second market-segment snapshot;
causing, by the market-segmentation computer, a first marketing message to be communicated to individual persons associated with a majority of records of said first subset of records of said second market-segment snapshot; and
causing, by the market-segmentation computer, a second marketing message to be communicated to individual persons associated with a majority of records of said second subset of records of said second market-segment snapshot.

22. The method of claim 21, further comprising:
automatically determining, by the market-segmentation computer, a first and a second plurality of response metrics associated with said first and second marketing messages; and
updating, by the market-segmentation computer in communication with the database server, the marketing database according to said first and second pluralities of response metrics.

23. The method of claim 22, further comprising providing, by the market-segmentation computer to the marketer terminal for display in said reduced-complexity marketer GUI, a reporting display graphically depicting a comparison of said first and said second plurality of response metrics.

24. The method of claim 17, further comprising:
updating, by the market-segmentation computer in communication with the database server, the marketing database with a second population including a particular record;
automatically determining, by the market-segmentation computer in communication with the database server, that said particular record corresponds to said stored dynamic-market-segment definition;
automatically identifying, by the market-segmentation computer, an ongoing marketing campaign associated with said stored dynamic-market-segment definition; and
automatically causing, by the market-segmentation computer, a first marketing message associated with said ongoing marketing campaign to be communicated to an individual associated with said particular record.

25. The method of claim 24, further comprising:
determining, by the market-segmentation computer in communication with the database server, the occurrence of a triggering event associated with said ongoing marketing campaign and said particular record; and
in response to the determined occurrence, automatically causing, by the market-segmentation computer, a second marketing message associated with said ongoing marketing campaign to be communicated to an individual associated with said particular record.

26. The method of claim 25, wherein said triggering event comprises a lapse of time since said updating the marketing database with said second population including said particular record.

27. The method of claim 17, further comprising updating the marketing database, by the market-segmentation computer in communication with the database server, with at least a selected one of a new person-related market-segmentation criterion and a new entity-related market-segmentation criterion.

28. The method of claim 27, wherein automatically determining query criteria to identify additional records in said current population of the marketing database comprises:
obtaining a current set of person-related market-segmentation criteria;
obtaining a current set of entity-related market-segmentation criteria;
dynamically identifying at least one mapping between a first criterion from among said current set of person-related market-segmentation criteria and a second criterion from among said current set of entity-related market-segmentation criteria;
automatically generating a query to identify said additional records according to said dynamically identified at least one mapping.

29. The method of claim 17, further comprising:
selecting, by the market-segmentation computer, a plurality of records of said first market-segment snapshot for display;
identifying, by the market-segmentation computer, at least one person record among said selected plurality of records;
determining, by the market-segmentation computer, that said at least one person record satisfies a restricted-identification criterion;
anonymizing, by the market-segmentation computer, identifying data corresponding to said at least one person record;
providing, by the market-segmentation computer to the marketer terminal for display in said reduced-complexity marketer GUI, a market segment display listing data corresponding to said selected plurality of records, including said anonymized identifying data.

30. The method of claim 29, further comprising causing, by the market-segmentation computer, a personalized marketing message to be communicated to said identified at least one person, having provided only anonymized identifying data for display in said reduced-complexity marketer GUI.

31. A non-transient computer-readable storage medium including instructions that, when executed by a processor, configure the processor to perform a method of reduced-complexity access to marketing data, the method being implemented by a market-segmentation computer communicatively coupled to a database server and a marketer terminal, the database server hosting a marketing database populated with a first population including a plurality of person records and a plurality of entity records, each of the plurality of person records comprising data corresponding to a plurality of person-related market-segmentation criteria, each of the plurality of entity records comprising data corresponding to a plurality of entity-related market-segmentation criteria, the method comprising:

providing, by the market-segmentation computer to a reduced-complexity marketer GUI displayed at the marketer terminal, a searchable list of the person-related and entity-related pluralities of market-segmentation criteria;

obtaining, by the market-segmentation computer from the marketer terminal via said reduced-complexity marketer GUI, a market-segment definition comprising at least one search key corresponding to a selected criterion from among the person-related and entity-related pluralities of market-segmentation criteria;

performing steps i-iii, by the market-segmentation computer in communication with the database server, to obtain a first market-segment snapshot:
  i) identifying, in a current population of the marketing database, a first set of records corresponding to said market-segment definition;
  ii) automatically determining a plurality of query criteria to identify additional records in said current population of the marketing database, said additional records being associated with members of said first set of records; and
  iii) identifying a second set of records according to said automatically-determined plurality of query criteria, the first and second sets of records comprising a current market-segment snapshot corresponding to said market-segment definition and said current population of the marketing database;

providing, by the market-segmentation computer to the marketer terminal for display in said reduced-complexity marketer GUI, a summary including metadata corresponding to said first market-segment snapshot;

storing, by the market-segmentation computer in communication with the database server, a reusable dynamic-market-segment definition corresponding to said market-segment definition;

identifying in said first population at least two records having at least partially matching data;

determining a duplication score for said at least two records;

determining that said duplication score exceeds a predetermined threshold; and consolidating said at least two records into a consolidated record;

wherein said determining a duplication score for said at least two records comprises:
  for each market-segmentation criterion shared between said at least two records:
    classifying the current shared market-segmentation criterion into a similarity class selected from at least a perfect-match class, a partial-match class, and a no-match class;
    selecting a match-score for the current shared market-segmentation criterion according to said classified similarity class and the current shared market-segmentation criterion; and
    accumulating said selected match-score into the duplication score for said at least two records.

32. A computing apparatus comprising a processor and a storage medium including instructions that, when executed by the processor, configure the apparatus to perform a method of reduced-complexity access to marketing data, the method being implemented by a market-segmentation computer communicatively coupled to a database server and a marketer terminal, the database server hosting a marketing database populated with a first population including a plurality of person records and a plurality of entity records, each of the plurality of person records comprising data corresponding to a plurality of person-related market-segmentation criteria, each of the plurality of entity records comprising data corresponding to a plurality of entity-related market-segmentation criteria, the method comprising:

providing, by the market-segmentation computer to a reduced-complexity marketer GUI displayed at the marketer terminal, a searchable list of the person-related and entity-related pluralities of market-segmentation criteria;

obtaining, by the market-segmentation computer from the marketer terminal via said reduced-complexity marketer GUI, a market-segment definition comprising at least one search key corresponding to a selected criterion from among the person-related and entity-related pluralities of market-segmentation criteria;

performing steps i-iii, by the market-segmentation computer in communication with the database server, to obtain a first market-segment snapshot:
  i) identifying, in a current population of the marketing database, a first set of records corresponding to said market-segment definition;
  ii) automatically determining a plurality of query criteria to identify additional records in said current population of the marketing database, said additional records being associated with members of said first set of records; and
  iii) identifying a second set of records according to said automatically-determined plurality of query criteria, the first and second sets of records comprising a current market-segment snapshot corresponding to said market-segment definition and said current population of the marketing database;

providing, by the market-segmentation computer to the marketer terminal for display in said reduced-complexity marketer GUI, a summary including metadata corresponding to said first market-segment snapshot;

storing, by the market-segmentation computer in communication with the database server, a reusable dynamic-market-segment definition corresponding to said market-segment definition;

identifying in said first population at least two records having at least partially matching data;

determining a duplication score for said at least two records;

determining that said duplication score exceeds a predetermined threshold; and consolidating said at least two records into a consolidated record;

wherein said determining a duplication score for said at least two records comprises:
  for each market-segmentation criterion shared between said at least two records:
    classifying the current shared market-segmentation criterion into a similarity class selected from at least a perfect-match class, a partial-match class, and a no-match class;
    selecting a match-score for the current shared market-segmentation criterion according to said classified similarity class and the current shared market-segmentation criterion; and
    accumulating said selected match-score into the duplication score for said at least two records.

* * * * *